(12) United States Patent
Agarwal et al.

(10) Patent No.: US 10,306,703 B2
(45) Date of Patent: *May 28, 2019

(54) RECEIVING UPON TRANSMIT AND TRANSMITTING UPON RECEIVE

(71) Applicant: QUALCOMM Incorporated, San Diego, CA (US)

(72) Inventors: Ravi Agarwal, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 15/188,798

(22) Filed: Jun. 21, 2016

(65) Prior Publication Data

US 2017/0171907 A1 Jun. 15, 2017

Related U.S. Application Data

(60) Provisional application No. 62/265,249, filed on Dec. 9, 2015, provisional application No. 62/265,244, filed
(Continued)

(51) Int. Cl.
*H04W 52/02* (2009.01)
*H04W 72/10* (2009.01)
(Continued)

(52) U.S. Cl.
CPC ....... *H04W 80/08* (2013.01); *H04W 52/0216* (2013.01); *H04W 52/0219* (2013.01);
(Continued)

(58) Field of Classification Search
CPC ............... H04W 76/048; H04W 76/28; H04W 52/0219; H04W 52/0216; H04W 80/08;
(Continued)

(56) References Cited

U.S. PATENT DOCUMENTS 7,813,296 B2 10/2010 Lindoff et al.
8,144,679 B2 3/2012 Cai et al.
(Continued)

FOREIGN PATENT DOCUMENTS

EP         2785112 A1    10/2014
WO   WO-2008151407 A1   12/2008
(Continued)

OTHER PUBLICATIONS

Szabo G., et al., "Service Aware Adaptive DRX Scheme," Globecom Workshops (GC Wkshps), Dec. 2014, pp. 1132-1138.
(Continued)

*Primary Examiner* — Walter J Divito
(74) *Attorney, Agent, or Firm* — Holland & Hart LLP

(57) ABSTRACT

Methods, systems, and devices for wireless communication are described. A wireless device may receive data during an active duration of a discontinuous reception (DRX) configuration. The wireless device may be configured such that it identifies a transmission opportunity following the reception opportunity, so that it may transmit a response to the received data during the transmission opportunity. In another example, the wireless device may transmit data during an active duration of a discontinuous transmission (DTX) configuration. The device may be configured such that it identifies a reception opportunity following the DTX active duration, so that a response may be received during the reception opportunity. The presence of a transmission opportunity following a DRX active duration, or a reception opportunity following a DTX active duration may depend on the service type and priority of the data being communicated, and may be either semi-statically configured or dynamically signaled.

28 Claims, 19 Drawing Sheets

Related U.S. Application Data on Dec. 9, 2015, provisional application No. 62/265,256, filed on Dec. 9, 2015.

(51) Int. Cl.
*H04W 76/28* (2018.01)
*H04W 80/08* (2009.01)

(52) U.S. Cl.
CPC .......... *H04W 72/10* (2013.01); *H04W 76/28* (2018.02); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/22* (2018.01); *Y02D 70/23* (2018.01); *Y02D 70/24* (2018.01); *Y02D 70/25* (2018.01)

(58) Field of Classification Search
CPC . H04W 72/10; Y02D 70/1264; Y02D 70/142; Y02D 70/122; Y02D 70/1242; Y02D 70/24; Y02D 70/1262; Y02D 70/00; Y02D 70/22; Y02D 70/146; Y02D 70/23; Y02D 70/25
See application file for complete search history.

(56) References Cited

U.S. PATENT DOCUMENTS

| | | | |
|---|---|---|---|
| 8,169,957 B2 | 5/2012 | Damnjanovic | |
| 8,265,682 B2 | 9/2012 | Bertrand et al. | |
| 9,204,389 B2 | 12/2015 | Godor et al. | |
| 2008/0279139 A1* | 11/2008 | Beziot | H04W 8/24 370/329 |
| 2009/0180414 A1 | 7/2009 | Maeda et al. | |
| 2012/0172081 A1 | 7/2012 | Love et al. | |
| 2013/0201892 A1 | 8/2013 | Holma et al. | |
| 2013/0272181 A1 | 10/2013 | Fong et al. | |
| 2014/0003314 A1 | 1/2014 | Shu et al. | |
| 2014/0071873 A1 | 3/2014 | Wang et al. | |
| 2015/0078307 A1 | 3/2015 | Ohta et al. | |
| 2015/0110093 A1 | 4/2015 | Asterjadhi et al. | |
| 2015/0117289 A1 | 4/2015 | Voigt et al. | |
| 2015/0124674 A1 | 5/2015 | Jamadagni et al. | |
| 2015/0230112 A1 | 8/2015 | Siomina et al. | |
| 2015/0282198 A1 | 10/2015 | Wang et al. | |
| 2016/0037578 A1 | 2/2016 | Shah et al. | |
| 2016/0080133 A1 | 3/2016 | Golitschek et al. | |
| 2016/0088681 A1 | 3/2016 | Chang et al. | |
| 2016/0157164 A1 | 6/2016 | Lee et al. | |
| 2017/0171818 A1 | 6/2017 | Agarwal et al. | |
| 2017/0171908 A1 | 6/2017 | Agarwal et al. | |
| 2017/0250786 A1 | 8/2017 | Better et al. | |
| 2017/0332288 A1 | 11/2017 | Sadek et al. | |
| 2018/0220371 A1 | 8/2018 | Agarwal et al. | |

FOREIGN PATENT DOCUMENTS

| | | | |
|---|---|---|---|
| WO | WO-2009033253 A1 | 3/2009 | |
| WO | WO-2009120124 A1 | 10/2009 | |

OTHER PUBLICATIONS

Lin D., et al., "Uplink Contention Based Multiple Access for 5G Cellular IoT," IEEE 82nd Vehicular Technology Conference (VTC Fall), 2015, pp. 1-5.

Nokia, "Active Mode DRX," 3GPP TSG-RAN WG2 Meeting #55, R2-062752, Seoul, Korea, Oct. 9-13, 2006, 3 pgs., XP002463499, 3rd Generation Partnership Project.

ISA/EP, International Search Report and Written Opinion of the International Searching Authority, Int'l Application No. PCT/US2016/064595, dated Apr. 21, 2017, European Patent Office, Rijswijk, NL, 16 pgs.

* cited by examiner

On Duration

Transmission Opportunity

Reception Opportunity

RECEIVING UPON TRANSMIT AND TRANSMITTING UPON RECEIVE

CROSS REFERENCES

The present Application for Patent claims priority to: U.S. Provisional Patent Application No. 62/265,249 by Agarwal, et al., entitled "Receiving on Transmit and Transmitting on Receive," filed Dec. 9, 2015, assigned to the assignee hereof, and is expressly incorporated by reference herein; U.S. Provisional Patent Application No. 62/265,244 by Agarwal, et al., entitled "Macro and Micro Discontinuous Reception," filed Dec. 9, 2015, assigned to the assignee hereof, and is expressly incorporated by reference herein; and U.S. Provisional Patent Application No. 62/265,256 by Agarwal et al., entitled "Macro and Micro Discontinuous Transmission," filed Dec. 9, 2015, assigned to the assignee hereof, and is expressly incorporated by reference herein.

The present Application for Patent is related to the following U.S. Patent Applications: "Macro and Micro Discontinuous Reception," by Agarwal, et al., Ser. No. 15/188,720, filed concurrently herewith, assigned to the assignee hereof, and expressly incorporated by reference herein; and "Macro and Micro Discontinuous Transmission" Ser. No. 15/188,854, filed concurrently herewith, assigned to the assignee hereof, and expressly incorporated by reference herein.

INTRODUCTION

The following relates generally to wireless communication, and more specifically to receiving upon transmit and transmitting upon receive.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a UE may establish a discontinuous reception (DRX) mode where it may periodically power up a radio to receive, and a discontinuous transmission (DTX) mode where it may periodically power up a radio to transmit. The UE may power down a radio between active durations of the DRX mode and the DTX mode to conserve power. However, in some cases the UE may generate a response to received data. Powering down until a subsequent transmission opportunity of the DTX mode may result in significant latency. Time sensitive response packets may be lost entirely. Similarly, if a device wakes up according to the DTX mode to transmit data there may also be an associated response, and waiting for a reception opportunity of the DRX mode may result in significant latency.

SUMMARY

A wireless device may receive downlink (DL) data associated with a service during an active duration (e.g., a reception opportunity, an on duration, etc.) of a DRX configuration. The wireless device may be configured such that it identifies a transmission opportunity following the active duration of the DRX configuration, so that it may transmit a response to the received DL data during the identified transmission opportunity. In another example, the wireless device may transmit uplink (UL) data during an active duration (e.g., a transmission opportunity, an on duration, etc.) of a DTX configuration. The device may be configured such that it identifies a reception opportunity following the active duration of the DTX configuration, so that a DL response may be received during the identified reception opportunity. The presence of a transmission opportunity following a DRX active duration, or a reception opportunity following a DTX active duration may depend on the service type and priority of the data being communicated, and may be either semi-statically configured (e.g., configured and maintained upon each establishment or reestablishment of a radio resource control (RRC) connection, etc.) or dynamically signaled. In some examples, transmitting or receiving a response may include modifying a DTX operation or modifying a DRX operation.

A method of wireless communication at a user equipment (UE) is described. The method may include receiving DL data associated with a service, identifying that a transmission opportunity is available for a response to the DL data based at least in part on a service type of the service, and transmitting an UL response to the DL data during the transmission opportunity based at least in part on the identifying.

An apparatus for wireless communication at a UE is described. The apparatus may include means for receiving DL data associated with a service, means for identifying that a transmission opportunity is available for a response to the DL data based at least in part on a service type of the service, and means for transmitting an UL response to the DL data during the transmission opportunity based at least in part on the identifying.

Another apparatus for wireless communication at a UE is described. The apparatus may include a processor and memory in electronic communication with the processor. The processor and memory may be configured to receive DL data associated with a service, identify that a transmission opportunity is available for a response to the DL data based at least in part on a service type of the service, and transmit an UL response to the DL data during the transmission opportunity based at least in part on the identification.

A non-transitory computer readable medium for wireless communication at a UE is described. The non-transitory computer-readable medium may include instructions executable by a processor to receive DL data associated with a service, identify that a transmission opportunity is available for a response to the DL data based at least in part on a service type of the service, and transmit an UL response to the DL data during the transmission opportunity based at least in part on the identification.

Some examples of the method, apparatuses, or non-transitory computer-readable medium may include operations, features, means, or instructions for modifying a DTX operation based at least in part on the received DL data or the identified transmission opportunity, and the UL response may be transmitted according to the modified DTX operation.

In some examples of the method, apparatuses, or non-transitory computer-readable medium, the DL data may be received during an active duration of a DRX configuration.

Some examples of the method, apparatuses, or non-transitory computer-readable medium may include operations, features, means, or instructions for receiving an indication that the transmission opportunity is available, and identifying that the transmission opportunity is available may be based at least in part on the received indication.

In some examples of the method, apparatuses, or non-transitory computer-readable medium, identifying that the transmission opportunity is available may include a determination by the UE based at least in part on the service type of the service.

In some examples of the method, apparatuses, or non-transitory computer-readable medium described above, the service type may include an upper protocol layer acknowledgement (ACK) mode (AM) and the UL response may include an ACK.

In some examples of the method, apparatuses, or non-transitory computer-readable medium described above, the service type may include a service priority level, and identifying that the transmission opportunity is available may include a determination by the UE based at least in part on the service priority level.

A method of wireless communication at a UE is described. The method may include transmitting UL data associated with a service, identifying that a reception opportunity is available for a response to the UL data based at least in part on a service type of the service, and receiving a DL response to the UL data during the reception opportunity based at least in part on the identifying.

An apparatus for wireless communication at a UE is described. The apparatus may include means for transmitting UL data associated with a service, means for identifying that a reception opportunity is available for a response to the UL data based at least in part on a service type of the service, and means for receiving a DL response to the UL data during the reception opportunity based at least in part on the identifying.

Another apparatus for wireless communication at a UE is described. The apparatus may include a processor and memory in electronic communication with the processor. The processor and memory may be configured to transmit UL data associated with a service, identify that a reception opportunity is available for a response to the UL data based at least in part on a service type of the service, and receive a DL response to the UL data during the reception opportunity based at least in part on the identification.

A non-transitory computer readable medium for wireless communication at a UE is described. The non-transitory computer-readable medium may include instructions executable by a processor to transmit UL data associated with a service, identify that a reception opportunity is available for a response to the UL data based at least in part on a service type of the service, and receive a DL response to the UL data during the reception opportunity based at least in part on the identification.

Some examples of the method, apparatuses, or non-transitory computer-readable medium may include operations, features, means, or instructions for modifying a DRX operation based at least in part on the transmitted data or the identified reception opportunity, and the DL response may be received according to the modified DRX operation.

In some examples of the method, apparatuses, or non-transitory computer-readable medium, the UL data may be transmitted during a transmission opportunity of a DTX configuration Some examples of the method, apparatuses, or non-transitory computer-readable medium may include operations, features, means, or instructions for receiving an indication that the reception opportunity is available, and identifying that the reception opportunity is available may be based at least in part on the indication.

In some examples of the method, apparatuses, or non-transitory computer-readable medium, identifying that the reception opportunity is available may include a determination by the UE based at least in part on the service type of the service.

In some examples of the method, apparatuses, or non-transitory computer-readable medium, the service type may include an upper protocol layer AM, and the DL response may include an ACK.

In some examples of the method, apparatuses, or non-transitory computer-readable medium, the service type may include a service priority level, and identifying that the reception opportunity is available may include a determination by the UE based at least in part on the service priority level.

A method of wireless communication at a wireless communications device is described. The method may include transmitting DL data associated with a service, identifying that a transmission opportunity is available for a response to the DL data based at least in part on a service type of the service, and receiving an UL response to the DL data during the transmission opportunity based at least in part on the identifying.

An apparatus for wireless communication at a wireless communications device is described. The apparatus may include means for transmitting DL data associated with a service, means for identifying that a transmission opportunity is available for a response to the DL data based at least in part on a service type of the service, and means for receiving an UL response to the DL data during the transmission opportunity based at least in part on the identifying.

Another apparatus for wireless communication at a UE is described. The apparatus may include a processor and memory in electronic communication with the processor. The processor and memory may be configured to transmit DL data associated with a service, identify that a transmission opportunity is available for a response to the DL data based at least in part on a service type of the service, and receive an UL response to the DL data during the transmission opportunity based at least in part on the identification.

A non-transitory computer readable medium for wireless communication at a wireless communications device is described. The non-transitory computer-readable medium may include instructions executable by a processor to transmit DL data associated with a service, identify that a transmission opportunity is available for a response to the DL data based at least in part on a service type of the service, and receive an UL response to the DL data during the transmission opportunity based at least in part on the identification.

Some examples of the method, apparatuses, or non-transitory computer-readable medium may include operations, features, means, or instructions for modifying a DTX operation based at least in part on the transmitted DL data or the identified transmission opportunity, and the UL response may be received according to the modified DTX operation.

In some examples of the method, apparatuses, or non-transitory computer-readable medium, the DL data may be transmitted during an active duration of a DRX configuration.

Some examples of the method, apparatuses, or non-transitory computer-readable medium may include operations, features, means, or instructions for transmitting an indication that the identified transmission opportunity is available.

In some examples of the method, apparatuses, or non-transitory computer-readable medium, identifying that the transmission opportunity is available may include a determination by the wireless communications device based at least in part on the service type of the service.

In some examples if the method, apparatuses, or non-transitory computer readable medium, the service type may include an upper protocol layer AM and the UL response may include an ACK.

In some examples of the method, apparatuses, or non-transitory computer-readable medium, the service type may include a service priority level, and identifying that the transmission opportunity is available may include a determination by the wireless communications device based at least in part on the service priority level.

A method of wireless communication at a wireless communications device is described. The method may include receiving UL data associated with a service, identifying that a reception opportunity is available for a response to the UL data based at least in part on a service type of the service, and transmitting a DL response to the UL data during the reception opportunity based at least in part on the identifying.

An apparatus for wireless communication at a wireless communications device is described. The apparatus may include means for receiving UL data associated with a service, means for identifying that a reception opportunity is available for a response to the UL data based at least in part on a service type of the service, and means for transmitting a DL response to the UL data during the reception opportunity based at least in part on the identifying.

Another apparatus for wireless communication at a UE is described. The apparatus may include a processor and memory in electronic communication with the processor. The processor and memory may be configured to receive UL data associated with a service, identify that a reception opportunity is available for a response to the UL data based at least in part on a service type of the service, and transmit a DL response to the UL data during the reception opportunity based at least in part on the identification.

A non-transitory computer readable medium for wireless communication at a wireless communications device is described. The non-transitory computer-readable medium may include instructions executable by a processor to receive UL data associated with a service, identify that a reception opportunity is available for a response to the UL data based at least in part on a service type of the service and transmit a DL response to the UL data during the reception opportunity based at least in part on the identification.

Some examples of the method, apparatuses, or non-transitory computer-readable medium may include operations, features, means, or instructions for modifying a DRX operation based at least in part on the identifying, and the DL response may be transmitted according to the modified DRX operation.

In some examples of the method, apparatuses, or non-transitory computer-readable medium, the UL data may be received during a transmission opportunity of a DTX configuration.

Some examples of the method, apparatuses, or non-transitory computer-readable medium may include operations, features, means, or instructions for transmitting an indication that the identified reception opportunity is available.

In some examples of the method, apparatuses, or non-transitory computer-readable medium, identifying that the reception opportunity is available may include a determination by the wireless communications device based at least in part on the service type of the service.

In some examples of the method, apparatuses, or non-transitory computer-readable medium, the service type may include an upper protocol layer AM and the DL response may include an ACK.

In some examples of the method, apparatuses, or non-transitory computer-readable medium, the service type may include a service priority level, and identifying that the reception opportunity is available may include a determination by the wireless communications device based at least in part on the service priority level.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

A wireless device may use a DRX cycle or DTX cycle to enable the efficient use of battery power and reduce latency for both DL and UL transmissions. After an RRC connection has been established between a base station and a user equipment (UE), a UE may enter a sleep state when not actively communicating. The DRX or DTX cycle may determine how frequently the UE wakes up to receive DL data or transmit UL data. The UL and DL data may include control signaling, user data, or both.

In some cases, UL and DL reception or transmission occasions may be coupled or de-coupled based on application requirements, which may increase UE power consumption. However, different DTX and DRX configurations, which may be referred to as Receive upon Transmit (Rx-upon-Tx) and Transmit upon Receive (Tx-upon-Rx) configurations, may be used to reduce latency and reduce power consumption. These configurations may be based on an application and service in addition to being UE-specific.

An Rx-upon-Tx configuration may enable a wireless device to remain awake for a period of time after transmitting data (e.g., according to a DTX configuration). Alternately, a Tx-upon-Rx configuration may enable a device to remain awake for transmissions following the receipt of data (e.g., according to a DRX configuration). In an example of Rx-upon-Tx, a UE may be configured to monitor for DL communications in following certain types of UL transmissions, which may include modifying a DTX operation. In an example of Tx-upon-Rx, a UE may be configured to send an UL transmission following data received in a DL transmission, which may include modifying a DRX operation. Both Rx-upon-Tx and Tx-upon-Rx may depend on traffic parameters. That is, while DRX and DTX cycles may be configured on a per UE basis, the availability of a transmission period following a DRX active duration (or a reception period following a DTX active duration) may depend on the type of service (e.g., whether the traffic is latency sensitive or "mission critical", the quality of service (QoS) parameters of the service, the priority or priority level of the data, or the acknowledgement mode (AM)).

Aspects of the disclosure are initially described in the context of a wireless communication system. Further examples are provided of DRX and DTX configurations using Rx-upon-Tx and Tx-upon-Rx. Aspects of the disclosure are then illustrated by and described with reference to apparatus diagrams, system diagrams, and flowcharts that relate to receiving upon transmit and transmitting upon receive.

Figure 1:
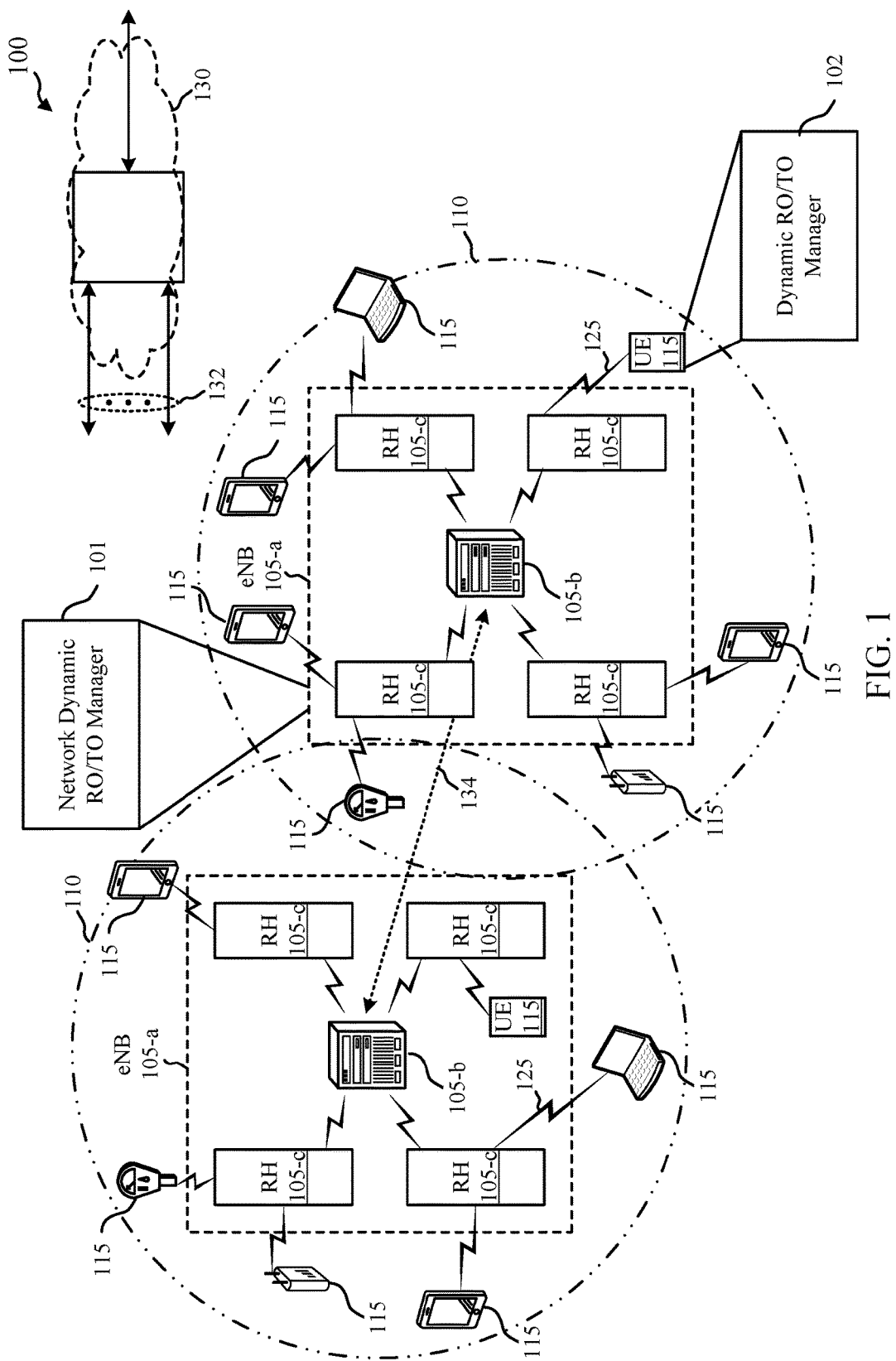
FIG. 1 illustrates an example of a wireless communication system that supports receiving upon transmit and transmitting upon receive, in accordance with one or more aspects of the present disclosure.

FIG. 1 illustrates an example of a wireless communication system 100 that supports receiving upon transmit and transmitting upon receive, in accordance with one or more aspects of the present disclosure. The wireless communication system 100 may include network devices 105, UEs 115, and a core network 130. Wireless communication system 100 may support dynamic RO and TO configurations to enable reduced latency and reduced power consumption. For example, wireless communication system 100 may support a TO following the reception of data during an active duration (e.g., an on duration, an identified reception opportunity, etc.) of a DRX configuration. Additionally or alternatively, a subsequent RO may follow the transmission of data during an active duration (e.g., an on duration, an identified transmission opportunity, etc.) of a DTX configuration.

The core network 130 may provide user authentication, access authorization, tracking, Internet Protocol (IP) connectivity, and other access, routing, or mobility functions. At least some of the network devices 105 (e.g., network device 105-a, which may be an example of an eNB or a base station, or network device 105-b, which may be an example of an access node controller (ANC)) may interface with the core network 130 through backhaul links 132 (e.g., S1, S2, etc.) and may perform radio configuration and scheduling for communication with the UEs 115. In various examples, the network devices 105-b may communicate, either directly or indirectly (e.g., through core network 130), with each other over backhaul links 134 (e.g., X1, X2, etc.), which may be wired or wireless communication links. Network devices 105-b may each be associated with a respective coverage area 110.

Each network device 105-b may also communicate with a number of UEs 115 through a number of other network devices 105-c, where network device 105-c may be an example of a smart radio head. In alternative configurations, various functions of each network device 105 may be distributed across various network devices 105 (e.g., radio heads and access network controllers) or consolidated into a single network device 105 (e.g., a base station).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the network devices 105-a and/or network devices 105-c may have similar frame timing, and transmissions from different network devices 105-a and/or network devices 105-c may be approximately aligned in time. For asynchronous operation, the network devices 105-a and/or network devices 105-c may have different frame timings, and transmissions from different network devices 105-a and/or network devices 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the RRC protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of network devices 105-*a*, network devices 105-*c*, base stations, access points, or other network devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include UL channels from a UE 115 to a network device 105-*c*, and/or DL channels, from a network device 105-*c* to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

The communication links 125 may support one or more services between devices of the wireless communication system 100. Services may include, for example, point-to-point (e.g., unicast) services between two devices (e.g., between a network device 105 and a UE 115, between a first UE 115 and a second UE 115, etc.), point-to-multipoint (e.g., broadcast or multicast) services between a device and a plurality of other devices (e.g., between a network device 105 and a plurality of UEs 115, between a UE 115 and a plurality of other UEs 115, etc.), or services forwarded by devices such as those services provided by way of a mesh network. Examples of services may include data services, data transfer services, data transfer services over transmission control protocol (TCP), data transfer services over user datagram protocol (UDP), voice services, voice-over-IP (VoIP) services, IP multimedia services, text messaging services, short message services (SMS), emergency broadcast services, emergency call services, public warning system services, internet services, multimedia broadcast and multicast services (MBMS), sensor data distribution services, vehicle-to-vehicle services, and/or the like, each of which may be considered as a type of service. Additionally or alternatively, types of services may include whether traffic associated with a service is latency sensitive (e.g., associated with a latency parameter, etc.) or "mission critical" (e.g., associated with an acceptable and/or threshold error rate, etc.), a quality of service (QoS) parameter associated with a service, a priority or priority level of data associated with a service, an acknowledgement mode (AM) of a service, and/or the like.

One or more of network devices 105 may include a network dynamic RO/TO manager 101, which may provide DRX and DTX configurations that enable a reception opportunity or transmission opportunity following a preceding transmission opportunity or reception opportunity, respectively. In some examples, the network dynamic RO/TO manager 101 may transmit DL data associated with a service, identify that a transmission opportunity is available for a response to the DL data based on a service type of the service, and receive an UL response to the DL data during the transmission opportunity based on the identification. In some examples, the network dynamic RO/TO manager 101 may receive UL data associated with a service, identify that a reception opportunity is available for a response to the UL data based on a service type of the service, and transmit a DL response to the UL data during the reception opportunity based on the identification. These features may include modifying operations of the DRX and/or DTX configurations.

UEs 115 may include a dynamic RO/TO manager 102, which may transmit UL data associated with a service, identify that a reception opportunity is available for a response to the UL data based on a service type of the service, and receive a DL response to the UL data during the reception opportunity based on the identification. The dynamic RO/TO manager 102 may also receive DL data associated with a service, identify that a transmission opportunity is available for a response to the DL data based on a service type of the service, and transmit an UL response to the DL data during the transmission opportunity based on the identification. These features may include modifying operations of the DRX and/or DTX configurations.

In some cases, a UE 115 may monitor a communication link 125 continuously for an indication that the UE 115 may receive data. In other cases (e.g., to conserve power and extend battery life) a UE 115 may be configured with a DRX or DTX cycle. A DRX cycle consists of an active duration (e.g., an "on duration") when the UE 115 may monitor for control information (e.g., on physical downlink control channel (PDCCH)) and an inactive duration (e.g., a "DRX period") when the UE 115 may power down radio components. A DTX cycle consists of an active duration (e.g., an "on duration") when the UE 115 may transmit a scheduling request and an inactive duration (e.g., a "DTX period") when the UE 115 may power down radio components. In some cases, a UE 115 may be configured with a short DRX or DTX cycle and a long DRX or DTX cycle. In some cases, a UE 115 may enter a long DRX or DTX cycle if it is inactive for one or more short DRX or DTX cycles. The transition between the short DRX or DTX cycle, the long DRX or DTX cycle and continuous reception may be controlled by an internal timer or by messaging from a network device 105.

A UE 115 may receive scheduling messages on a PDCCH during the on duration. While monitoring PDCCH for a scheduling message, the UE 115 may initiate a "DRX Inactivity Timer" or a "DTX Inactivity Timer". If a scheduling message is successfully received, the UE 115 may prepare to receive data and the DRX Inactivity Timer may be reset. Additionally or alternatively, UE 115 may prepare to transmit data and the DTX Inactivity Timer may be reset. When the DRX Inactivity Timer expires without receiving a scheduling message, the UE 115 may move into a short DRX or short DTX cycle and may start a "DRX Short Cycle Timer" or "DTX Short Cycle Timer". When the DRX Short Cycle Timer or DTX Short Cycle Timer expires, the UE 115 may resume a long DRX or DTX cycle.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, a wireless communications system may utilize one enhanced component carriers (ECC) or more than one ECC. An ECC may be characterized by one or more features including: flexible bandwidth, variable length TTIs, and modified control channel configuration. In some cases, an ECC may be associated with a carrier aggregation configuration or a dual connectivity configuration (e.g., when multiple serving cells have a suboptimal backhaul link). An ECC may also be configured for use in unlicensed spectrum or shared spectrum (where more than one operator is licensed to use the spectrum). An ECC characterized by flexible bandwidth may include one or more segments that may be utilized by UEs 115 that are not capable of monitoring the whole bandwidth or prefer to use a limited bandwidth (e.g., to conserve power).

In some cases, an ECC may utilize a variable TTI length, which may include use of a reduced or variable symbol duration. In some cases the symbol duration may remain the same, but each symbol may represent a distinct TTI. In some cases an ECC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an ECC may utilize an ePDCCH for DL control information). For example, one or more control channels of an ECC may utilize FDM scheduling to accommodate flexible bandwidth use. Other control channel modifications include the use of additional control channels (e.g., for eMBMS scheduling, or to indicate the length of variable length UL and DL bursts), or control channels transmitted at different intervals. An ECC may also include modified or additional HARQ related control information.

Thus, a UE 115 may receive DL data associated with a service during an active duration of a DRX configuration. The UE 115 may be configured such that it may identify a transmission opportunity following the receiving of the DL data, so that it may transmit a response to the received DL data during the transmission opportunity. In another example, the UE 115 may transmit UL data during an active duration of a DTX configuration. The UE 115 may be configured such that it may identify a reception opportunity following the transmission of the UL data, so that a DL response may be received during the reception opportunity. The presence of a transmission opportunity following a DRX active duration, or a reception opportunity following a DTX active duration may depend on the service type and priority of the data being communicated, and may be either semi-statically configured or dynamically signaled. In some examples, these features may include modifying an operation of a DRX or a DTX configuration.

Figure 2:
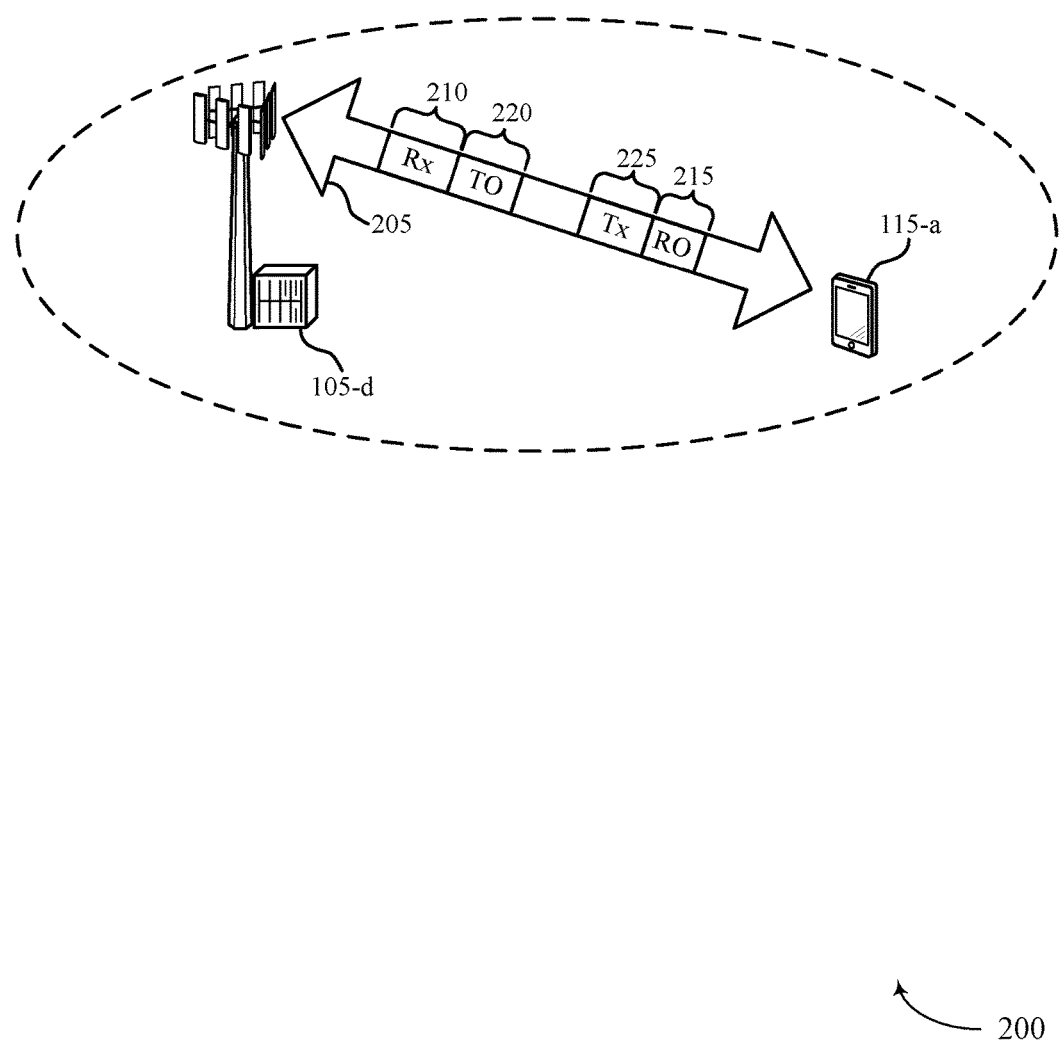
FIG. 2 illustrates an example of a wireless communication system that supports receiving upon transmit and transmitting upon receive, in accordance with one or more aspects of the present disclosure.

FIG. 2 illustrates an example of a wireless communication system 200 that supports receiving upon transmit and transmitting upon receive, in accordance with one or more aspects of the present disclosure. Wireless communication system 200 may include network device 105-*d* and UE 115-*a*, which may be examples of the corresponding devices described with reference to FIG. 1. Network device 105-*d* and UE 115-*a* may communicate via wireless communications 205. Wireless communication system 200 may support dynamic transmission and reception opportunities between the network device 105-*d* and UE 115-*a* to allow for reduced latency and efficient power consumption.

In wireless communication system 200, UE 115-*a* may use a DRX cycle (or a DTX cycle) to enable the efficient use of battery power. After an RRC connection has been established between a base station, UE 115-*a* may enter a sleep state when not actively communicating. The DRX cycle may determine how frequently UE 115-*a* wakes up to check for incoming transmissions, such as paging messages, scheduling information, and data. The DTX cycle may determine when UE 115-*a* may wake up to transmit UL data. For example, based on a DRX configuration, UE 115-*a* may wake up during periodic subframes to monitor control channels (e.g., a primary downlink control channel, a PDCCH, etc.) for scheduled data.

A DRX on duration may correspond to an initial number of DL subframes that UE 115-*a* remains awake to receive data. Network device 105-*d* may transmit an indication of whether further data will be transmitted to UE 115-*a* during a subsequent reception opportunity 210. In some cases, UE 115-*a* may use a reduced power monitoring configuration during the DRX active duration. A DTX on duration may refer to a period prior to a DTX transmission opportunity 225 during which UE 115-*a* may transmit a scheduling request or receive an UL resource grant.

In some cases, following the successful decoding of a DL transmission, UE 115-*a* may stay awake and begin an inactivity timer. The inactivity timer may correspond to the time that UE 115-*a* waits after the last successful decoding of a PDCCH until the reception of another control message. In the event that no message is received, UE 115-*a* may re-enter DRX. In some cases, the inactivity timer may be restarted following a first DL message but may not be used after subsequent messages.

While an on duration may refer to an initial monitoring period, the total duration that UE 115-*a* is awake may be referred to as the DRX active duration. The active duration includes the DRX on duration of the DRX cycle, the reception opportunity 210 during which UE 115-*a* is actively receiving data, and in some cases, a waiting period during which an inactivity timer has not expired (e.g., UE 115-*a* is inactive, but awake). A DTX active duration may include the DTX on duration and the DTX transmission opportunity 225. In some cases, a DRX active duration may also include a transmission opportunity 220 following a DRX reception opportunity 210. Similarly, a DTX active duration may include a reception opportunity 215 following the DTX transmission opportunity 225. Thus, operations of a DRX configuration or a DTX configuration can be modified to provide Tx-upon-RX and Rx-upon-TX functionality.

In some cases, DRX or DTX may be configured on a per UE basis (as opposed to a per radio bearer basis). That is, a single DRX or DTX configuration may be applied to a given UE 115 at any time. For example, when UE 115-*a* has only one service that is being handled through the allocation of predefined resources, the DRX or DTX configuration may allow for other signaling (such as RRC signaling) to be sent or received during a remaining portion of the active duration discussed above. Available DRX or DTX configurations may be controlled by the network. For example, the maximum DRX or DTX cycle may have the same duration as a paging cycle used in a connection management mode (e.g., an evolved packet system (EPS) connection management (ECM)-IDLE mode).

Some communications may take place independent of a DRX or DTX configuration. For example, UE 115-*a* may use the first available random access channel (RACH) opportunity to send an uplink measurement report. HARQ operations related to data transmission may also be independent of DRX operation.

In some DRX configurations, UE 115-*a* may be further configured with an on duration timer, during which UE 115-*a* may monitor for control messages that include possible data allocations. Some DRX configurations may enable periodic channel quality indicator (CQI) reports to be sent by UE 115-*a* during the active duration. In some cases, RRC signaling may be used to coordinate periodic CQI reports so that they are sent during the on duration. Additionally, a timer for a timing advance group (TAG) in UE 115-*a* may be used to enable UE 115-*a* to obtain a timing advance for each TAG.

If UE 115-*a* has not successfully decoded any PDCCH transmissions during an on duration, it may re-enter DRX sleep (if allowed by the DRX configuration). The ability to re-enter sleep may also apply to the sub-frames where UE 115-*a* has been allocated predefined resources. If UE 115-*a* successfully decodes a PDCCH transmission, UE 115-*a* may stay awake until the expiration of the inactivity timer or until a MAC control message tells UE 115-*a* to re-enter DRX sleep.

In some cases, a network may ensure that it is aware of whether UE 115-*a* remains within a coverage area by requesting that UE 115-*a* send periodic signals to the network. In wireless networks using carrier aggregation (CA), if UE 115-*a* is configured with only one serving cell (e.g., a primary cell (PCell)) the DRX or DTX associated with CA-enabled wireless systems may be used to determine the cycle for other component carriers. For example, the same DRX or DTX operation may be applied to all configured and activated serving cells (e.g., each cell may have an identical active duration for PDCCH monitoring). In networks using dual connectivity (DC), separate DRX or DTX configurations can be applied to a master cell group (MCG) and a secondary cell group (SCG), and group specific DRX or DTX operation may be applied to all configured and activated serving cells in the same cell group.

Certain applications may be delay sensitive, such as applications utilizing an acknowledgment mode (AM) via upper protocol layers (e.g., RLC AM via an RLC layer, PDCP AM via a PDCP layer, etc.), and a fast turnaround time may be preferred (e.g., for RLC ACK, PDCP ACK, etc.). The inefficiencies inherent in scheduling both delay sensitive and delay tolerant applications may introduce significant costs for a network provider. Thus, in some cases UL and DL reception occasions may be coupled/de-coupled based on the application requirements. However, DTX and DRX configurations, such as those supporting modified operations including Receive on Transmit (Rx-upon-Tx) and Transmit on Receive (Tx-upon-Rx) operations, may be used to improve latency and reduce power consumption. These configurations may be based on an application and service in addition to being UE specific.

An Rx-upon-Tx configuration may enable UE 115-*a* to remain awake for a transmission opportunity 220 after transmitting data during DTX transmission opportunity 225. Alternately, a Tx-upon-Rx configuration may enable a device to remain awake for a transmission opportunity 220 following the receipt of data during DRX reception opportunity 210. Service and application specific Rx-upon-Tx and Tx-upon-Rx configurations may enable efficient power consumption by a wireless device.

In one example of Rx-upon-Tx, UE 115-*a* may be configured to monitor for DL communications in following certain types of UL transmissions. The network device 105-*d* may know if UE 115-*a* is listening based on a service indication in the received packets. UE 115-*a* may know if it is allowed to transmit based on the nature of the received DL packets.

Both Rx-upon-Tx and Tx-upon-Rx may depend on traffic parameters. That is, while DRX and DTX cycles may be configured on a per UE basis, the availability of a transmission opportunity 220 during a DRX active duration (or a reception opportunity 215 during a DTX on active duration) may depend on the type of service. In some cases, harmonization rules may be used to determine UE behavior when multiple services are active. For example, UE 115-*a* may prioritize each service and follow the DRX parameter of the highest priority service.

Figure 3A:
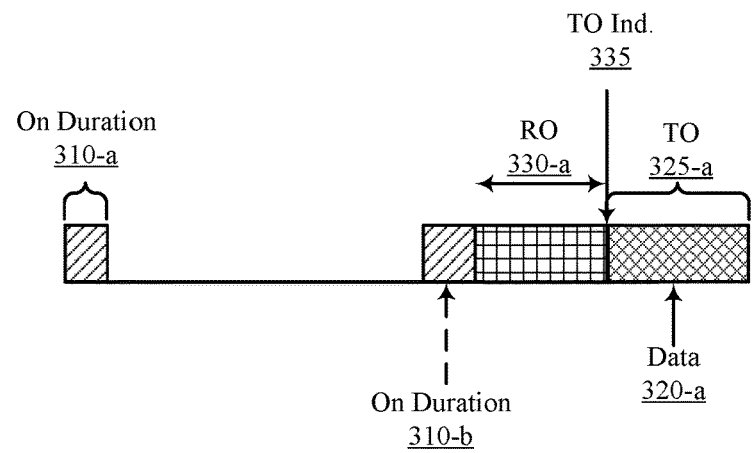
FIGS. 3A and 3B illustrate examples of DRX configurations and DTX configurations that support receiving upon transmit and transmitting upon receive, in accordance with one or more aspects of the present disclosure.
Figure 3A:
Figure 3A:
Figure 3A:
Figure 3B:
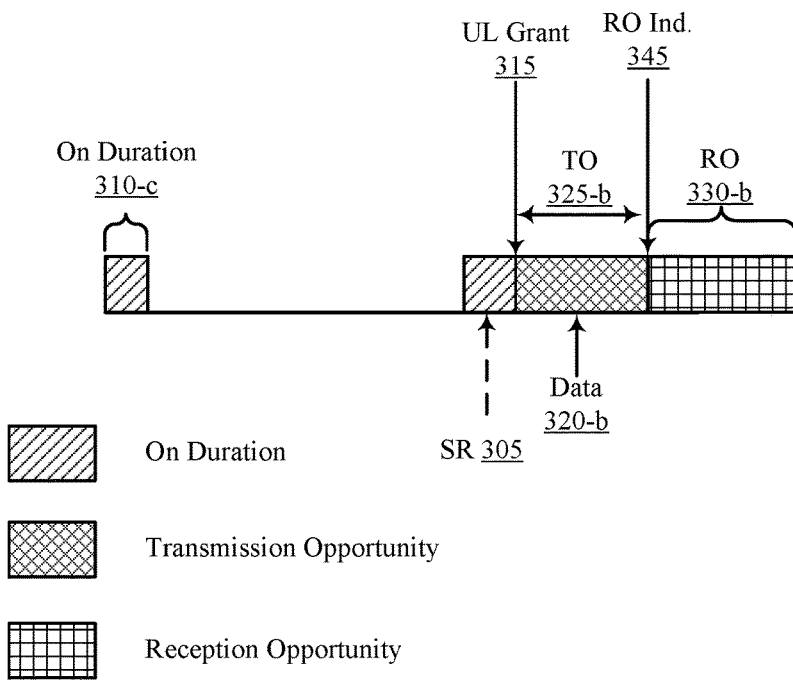

FIGS. 3A and 3B illustrate examples of DRX configurations 301 and DTX configurations 302 that support receiving upon transmit and transmitting upon receive, in accordance with one or more aspects of the present disclosure. In some cases, DRX configurations 301 and DTX configuration 302 may represent aspects of techniques performed by a UE 115 or network device 105 as described with reference to FIGS. 1 and 2.

DRX configuration 301 may support Tx-upon-Rx, which may be configured when an RRC connection is established between a UE 115 and a network device 105. In some cases, a UE 115 may wake up for on duration 310-*a* and determine that no data is available to be received. In other cases, such as during on duration 310-*b*, UE 115 may be scheduled to receive data during reception opportunity 330-*a*. A reception opportunity 330-*a* may be indicated during the on duration 310-*b* as a duration immediately following the on duration 310-*b*, or at some other time after the on duration 310-*b*. The reception opportunity 330-*a* may be indicated as a duration of time, or some quantity of TTIs (e.g., a quantity of frames, or a quantity of subframes, or a quantity of symbol periods, etc.).

A Tx-upon-Rx configuration may enable UE 115 to remain awake to transmit a response (e.g., UL data 320-a, which may include an AM ACK, etc.) during transmission opportunity 325-a. In some cases, a network device 105 may send a transmission opportunity indication 335 to notify the UE 115 that transmission opportunity 325-a is available. In other cases, the presence of the transmission opportunity 325-a may be semi-statically configured or determined implicitly by a UE 115 based on other factors. The presence of the transmission opportunity 325-a may depend on the service type or priority of the data received during reception opportunity 330-a. In some examples the transmission opportunity 325-a may be configured (e.g., implicitly or explicitly) as a duration immediately following the reception opportunity 330-a so that the UE 115 may remain awake, and the transmission opportunity 325-a may be configured as a duration of time, or some quantity of TTIs (e.g., a quantity of frames, or a quantity of subframes, or a quantity of symbol periods, etc.). For example, where the transmission opportunity 325-a is configured to support acknowledgement information responsive to data received during the reception opportunity 330-a, the transmission opportunity 325-a may be configured to include a quantity of TTIs suitable for transmitting AM ACK/NACK (e.g., one or more subframes comprising a physical uplink control channel (PUCCH) for transmitting responsive AM ACK/NACK, one or more symbol periods comprising a PUCCH suitable for transmitting responsive AM ACK/NACK, etc.).

In some examples a transmission opportunity 325 may be indicated (e.g., by a transmission opportunity indication 335), configured (e.g., implicitly or explicitly), or otherwise determined by a UE 115 such that the transmission opportunity 325 does not immediately follow a reception opportunity 330 (e.g., the transmission opportunity 325 may be indicated, configured, or determined for a future time). In various examples the UE 115 may remain awake during an intervening time between the reception opportunity 330 and the subsequent transmission opportunity 325 at a future time, or the UE may power down various components (e.g., in a sleep mode, a sleep state, etc.) during an intervening time between the reception opportunity 330 and the subsequent transmission opportunity 325 at a future time.

DTX configuration 302 may support Tx-upon-Rx. After an RRC connection is established between a UE 115 and a network device 105, UE 115 may monitor for incoming UL grants during an on duration 310-c. If no grant is received the UE 115 may return to a sleep mode. In some cases, UE 115 may transmit a scheduling request (SR) 305, following which network device 105 may transmit an UL grant 315. If UE 115 receives an UL grant 315 (with or without the SR 305), it may then transmit UL data 320-b during transmission opportunity 325-b (e.g., as indicated by the UL grant 315).

An Rx-upon-Tx configuration may enable the UE 115 to remain awake, and subsequently receive a response (e.g., data, an AM ACK, etc.) during reception opportunity 330-b. In some cases, the presence of the reception opportunity 330-b may be determined based on a reception opportunity indication 345 received from a network device 105. In other cases, the presence of the reception opportunity 330-b may be semi-statically configured or determined implicitly by a UE 115 based on other factors. The presence of the reception opportunity 330-b may depend on the service type or priority of the data transmitted during transmission opportunity 325-b. In some examples the reception opportunity 330-b may be configured (e.g., implicitly or explicitly) as a duration immediately following the transmission opportunity 325-b so that the UE 115 may remain awake, and the reception opportunity 330-b may be configured as a duration of time, or some quantity of TTIs (e.g., a quantity of frames, or a quantity of subframes, or a quantity of symbol periods, etc.). For example, where the reception opportunity 330-b is configured to support acknowledgement information responsive to data transmitted during the transmission opportunity 325-b, the reception opportunity 330-b may be configured to include a quantity of TTIs suitable for receiving AM ACK/NACK (e.g., one or more subframes comprising a physical HARQ indicator channel (PHICH) that carries responsive AM ACK/NACK, one or more symbol periods comprising a PHICH that carries responsive AM ACK/NACK, etc.).

In some examples a reception opportunity 330 may be indicated (e.g., by a reception opportunity indication 345), configured (e.g., implicitly or explicitly), or otherwise determined by a UE 115 such that the reception opportunity 330 does not immediately follow a transmission opportunity 325 (e.g., the reception opportunity 330 may be indicated, configured, or determined for a future time). For example, a future time for a reception opportunity 330 may be determined by the network (e.g., a serving network device 105, a core network 130, etc.) based on network load, network round trip delays, and/or the like. In various examples the UE 115 may remain awake during an intervening time between the transmission opportunity 325 and the subsequent reception opportunity 330 at a future time, or the UE may power down various components (e.g., in a sleep mode, a sleep state, etc.) during an intervening time between the transmission opportunity 325 and the subsequent reception opportunity 330 at a future time.

Figure 4A:
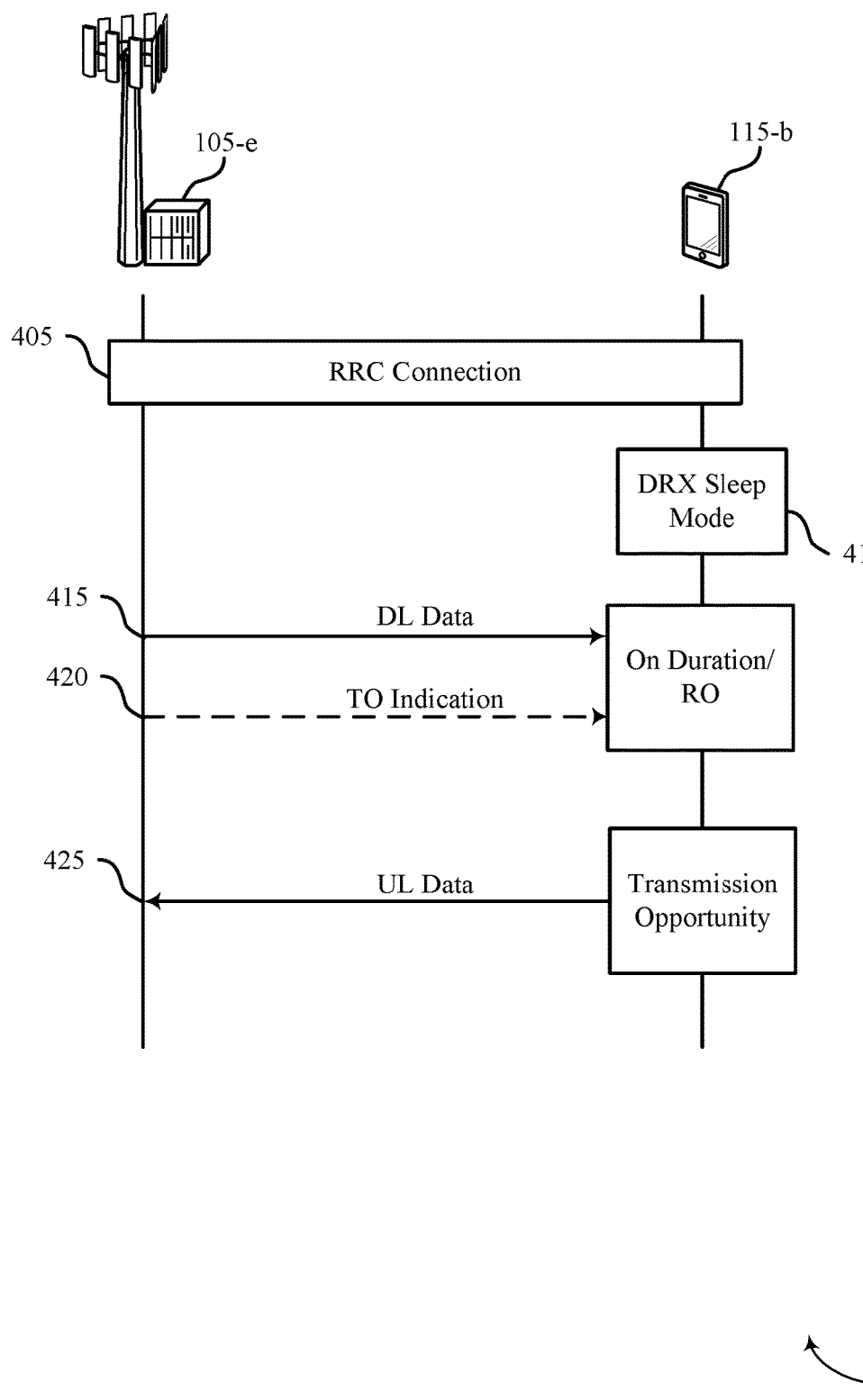
FIGS. 4A and 4B illustrate examples of process flows that supports receiving upon transmit and transmitting upon receive, in accordance with one or more aspects of the present disclosure.

FIG. 4A illustrates an example of a process flow 400 that supports transmitting upon receive, in accordance with one or more aspects of the present disclosure. The operations of process flow 400 may be performed by network device 105-e and UE 115-b, which may be examples of the corresponding devices described with reference to FIGS. 1 and 2.

At 405, network device 105-e and UE 115-b may establish an RRC connection, which may include a DRX configuration that supports transmit upon receive operations. Operations at 405 may be performed at the UE 115-b by a UE wireless communications manager (e.g., UE wireless communications manager 840 described with reference to FIG. 8), and may be performed in cooperation with a transmitter or receiver (e.g., a receiver 505 or 605, or a transmitter 515 or 635 as described with reference to FIG. 5 or 6, or a transceiver 825 as described with reference to FIG. 8). Additionally or alternatively, operations at 405 may be performed at the network device 105-e by a base station communications manager (e.g., base station communications manager 1235 described with reference to FIG. 12), which may be performed in cooperation with a transmitter or receiver (e.g., a receiver 905 or 1005, or a transmitter 915 or 1035 as described with reference to FIG. 9 or 10, or a transceiver 1225 as described with reference to FIG. 12).

At 410, UE 115-b may enter a DRX sleep mode according to the DRX configuration. Operations at 410 may be performed at the UE 115-b by a dynamic RO/TO manager (e.g., a dynamic RO/TO manager 510, 610, 700, or 840 as described with reference to FIGS. 5 through 8).

At 415, network device 105-e may transmit, and UE 115-b may receive, DL data associated with a service during an on duration or a reception opportunity of the DRX configuration. The service may be high priority, latency sensitive, or a service associated with acknowledgement transmissions (e.g., an upper protocol layer acknowledgement mode (AM)). Operations at 415 may be performed at the UE 115-b by a receiver (e.g., a receiver 505 or 605 as described with reference to FIG. 5 or 6, or a transceiver 825 as described with reference to FIG. 8), and may be performed in cooperation with a dynamic RO/TO manager (e.g., a dynamic RO/TO manager 510, 610, 700, or 840 as described with reference to FIGS. 5 through 8). Additionally or alternatively, operations at 415 may be performed at the network device 105-e by a transmitter (e.g., a transmitter 915 or 1035 as described with reference to FIG. 9 or 10, or a transceiver 1225 as described with reference to FIG. 12), and may be performed in cooperation with a network dynamic RO/TO manager (e.g., network dynamic RO/TO manager 910, 1010, 1100, or 1205 as described with reference to FIGS. 9 through 12).

In some cases, at 420, network device 105-e may transmit, and UE 115-b may receive, an indication that a transmission opportunity is available following the DRX on duration or the reception opportunity. In some cases, the network device 105-e or the UE 115-b may determine that the transmission opportunity is available for a response to the DL data based on a service type of the received data. In some cases, the service type includes an upper protocol layer AM (e.g., RLC AM, PDCP AM, etc.) or a service priority level, and the identification may be based at least in part on a service priority level. Operations at 420 may be performed at the UE 115-b by a receiver (e.g., a receiver 505 or 605 as described with reference to FIG. 5 or 6, or a transceiver 825 as described with reference to FIG. 8), and may be performed in cooperation with a dynamic RO/TO manager (e.g., a dynamic RO/TO manager 510, 610, 700, or 840 as described with reference to FIGS. 5 through 8). Additionally or alternatively, operations at 420 may be performed at the network device 105-e by a transmitter (e.g., a transmitter 915 or 1035 as described with reference to FIG. 9 or 10, or a transceiver 1225 as described with reference to FIG. 12), and may be performed in cooperation with a network dynamic RO/TO manager (e.g., network dynamic RO/TO manager 910, 1010, 1100, or 1205 as described with reference to FIGS. 9 through 12).

At 425, UE 115-b may transmit, and network device 105-e may receive, an UL response to the DL data during the transmission opportunity based on the determination that the transmission opportunity is associated with the DRX active duration. In some cases, the UL response may include an ACK, such as an ACK associated with an RLC AM or an ACK associated with a PDCP AM. Operations at 425 may be performed at the UE 115-b by a transmitter (e.g., a transmitter 515 or 635 as described with reference to FIG. 5 or 6, or a transceiver 825 as described with reference to FIG. 8), and may be performed in cooperation with a dynamic RO/TO manager (e.g., a dynamic RO/TO manager 510, 610, 700, or 840 as described with reference to FIGS. 5 through 8). Additionally or alternatively, operations at 425 may be performed at the network device 105-e by a receiver (e.g., a receiver 905 or 1005 as described with reference to FIG. 9 or 10, or a transceiver 1225 as described with reference to FIG. 12), and may be performed in cooperation with a network dynamic RO/TO manager (e.g., network dynamic RO/TO manager 910, 1010, 1100, or 1205 as described with reference to FIGS. 9 through 12).

Figure 4B:
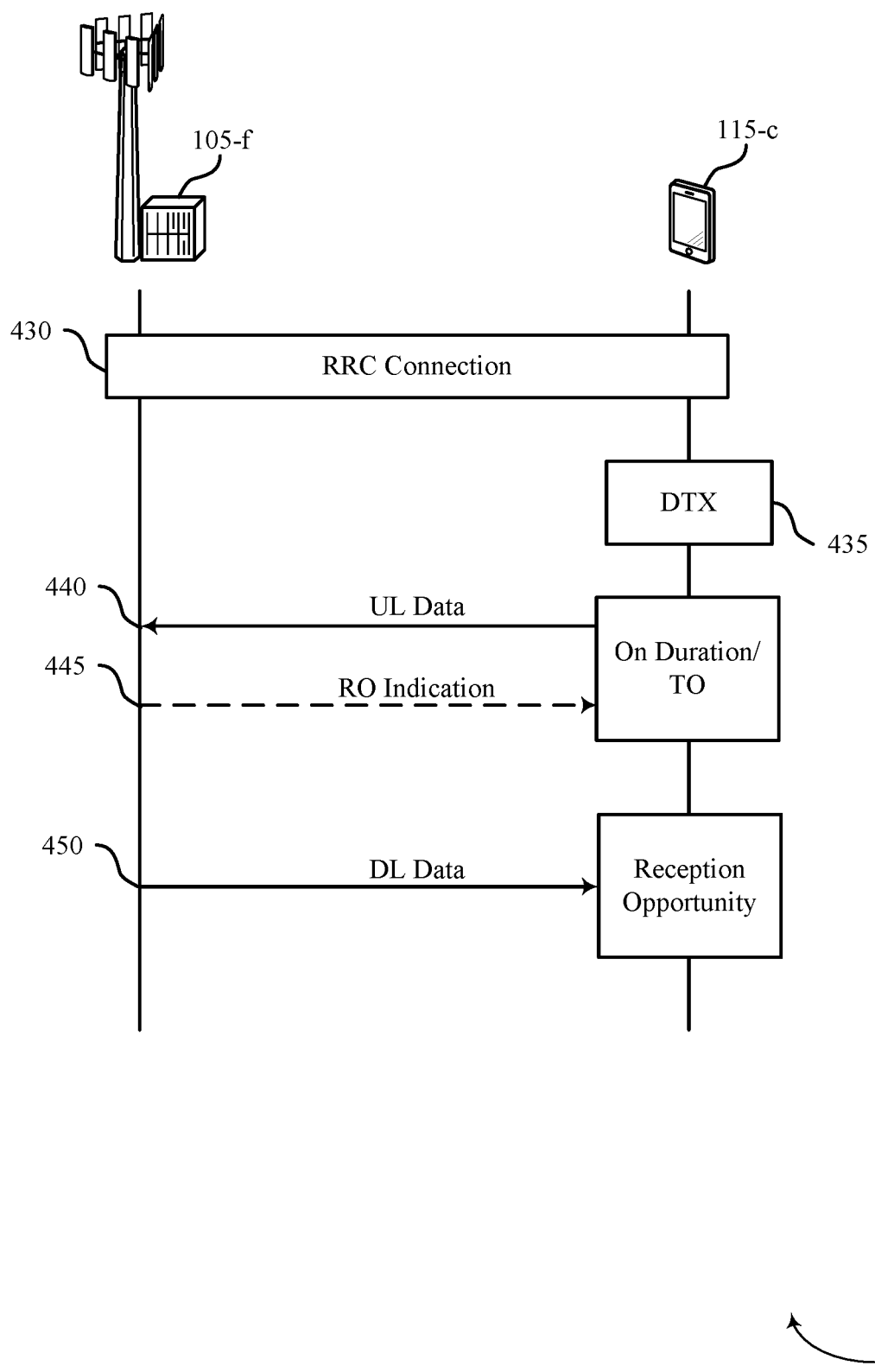

FIG. 4B illustrates an example of a process flow 401 that supports receiving upon transmit, in accordance with one or more aspects of the present disclosure. The operations of process flow 401 may be performed by network device 105-f and UE 115-c, which may be examples of the corresponding devices described with reference to FIGS. 1 and 2.

At 430, network device 105-f and UE 115-c may establish an RRC connection that may include a DTX configuration that supports receive upon transmit operations. Operations at 430 may be performed at the UE 115-c by a UE wireless communications manager (e.g., UE wireless communications manager 840 described with reference to FIG. 8), and may be performed in cooperation with a transmitter or receiver (e.g., a receiver 505 or 605, or a transmitter 515 or 635 as described with reference to FIG. 5 or 6, or a transceiver 825 as described with reference to FIG. 8). Additionally or alternatively, operations at 430 may be performed at the network device 105-f by a base station communications manager (e.g., base station communications manager 1235 described with reference to FIG. 12), which may be performed in cooperation with a transmitter or receiver (e.g., a receiver 905 or 1005, or a transmitter 915 or 1035 as described with reference to FIG. 9 or 10, or a transceiver 1225 as described with reference to FIG. 12).

At 435, UE 115-c may enter a DTX sleep mode according to the DTX configuration. Operations at 435 may be performed at the UE 115-c by a dynamic RO/TO manager (e.g., a dynamic RO/TO manager 510, 610, 700, or 840 as described with reference to FIGS. 5 through 8).

At 440, network device 105-f may receive UL data associated with a service from UE 115-c during an on duration or a transmission opportunity of the DTX configuration. The service may be high priority, latency sensitive, or a service associated with acknowledgement transmissions (e.g., RLC AM, PDCP AM, etc.). In some cases, UE 115-c may transmit a scheduling request during an on duration prior to transmitting the UL data. Regardless of whether UE 115-c transmitted a scheduling request, network device 105-f may transmit an UL grant, and the UL data may be transmitted using resources indicated in the UL grant. Operations at 440 may be performed at the UE 115-c by a transmitter (e.g., a transmitter 515 or 635 as described with reference to FIG. 5 or 6, or a transceiver 825 as described with reference to FIG. 8), and may be performed in cooperation with a dynamic RO/TO manager (e.g., a dynamic RO/TO manager 510, 610, 700, or 840 as described with reference to FIGS. 5 through 8). Additionally or alternatively, operations at 440 may be performed at the network device 105-f by a receiver (e.g., a receiver 905 or 1005 as described with reference to FIG. 9 or 10, or a transceiver 1225 as described with reference to FIG. 12), and may be performed in cooperation with a network dynamic RO/TO manager (e.g., network dynamic RO/TO manager 910, 1010, 1100, or 1205 as described with reference to FIGS. 9 through 12).

In some cases, at 445, network device 105-f may transmit, and UE 115-c may receive, an indication that a reception opportunity is permitted following the DTX on duration or the reception opportunity. In some cases, the network device 105-f or the UE 115-c may determine that the reception opportunity is available based on a service type of the transmitted data. In some cases, the service type includes an upper protocol layer AM (e.g., RLC AM, PDCP AM, etc.), or a service priority level, and the determination is based at least in part on a service priority level. Operations at 445 may be performed at the UE 115-c by a receiver (e.g., a receiver 505 or 605 as described with reference to FIG. 5 or 6, or a transceiver 825 as described with reference to FIG. 8), and may be performed in cooperation with a dynamic RO/TO manager (e.g., a dynamic RO/TO manager 510, 610, 700, or 840 as described with reference to FIGS. 5 through 8). Additionally or alternatively, operations at 445 may be performed at the network device 105-f by a transmitter (e.g., a transmitter 915 or 1035 as described with reference to FIG. 9 or 10, or a transceiver 1225 as described with reference to FIG. 12), and may be performed in cooperation with a network dynamic RO/TO manager (e.g., network dynamic RO/TO manager 910, 1010, 1100, or 1205 as described with reference to FIGS. 9 through 12).

At 450, UE 115-c may receive DL data from network device 105-f in response to the UL data sent during the transmission opportunity based on the determination that the reception opportunity is associated with the DTX active duration. In some cases, the DL response may include an ACK, such as an ACK associated with an RLC AM or an ACK associated with a PDCP AM. Operations at 450 may be performed at the UE 115-c by a receiver (e.g., a receiver 505 or 605 as described with reference to FIG. 5 or 6, or a transceiver 825 as described with reference to FIG. 8), and may be performed in cooperation with a dynamic RO/TO manager (e.g., a dynamic RO/TO manager 510, 610, 700, or 840 as described with reference to FIGS. 5 through 8). Additionally or alternatively, operations at 450 may be performed at the network device 105-f by a transmitter (e.g., a transmitter 915 or 1035 as described with reference to FIG. 9 or 10, or a transceiver 1225 as described with reference to FIG. 12), and may be performed in cooperation with a network dynamic RO/TO manager (e.g., network dynamic RO/TO manager 910, 1010, 1100, or 1205 as described with reference to FIGS. 9 through 12).

Figure 5:
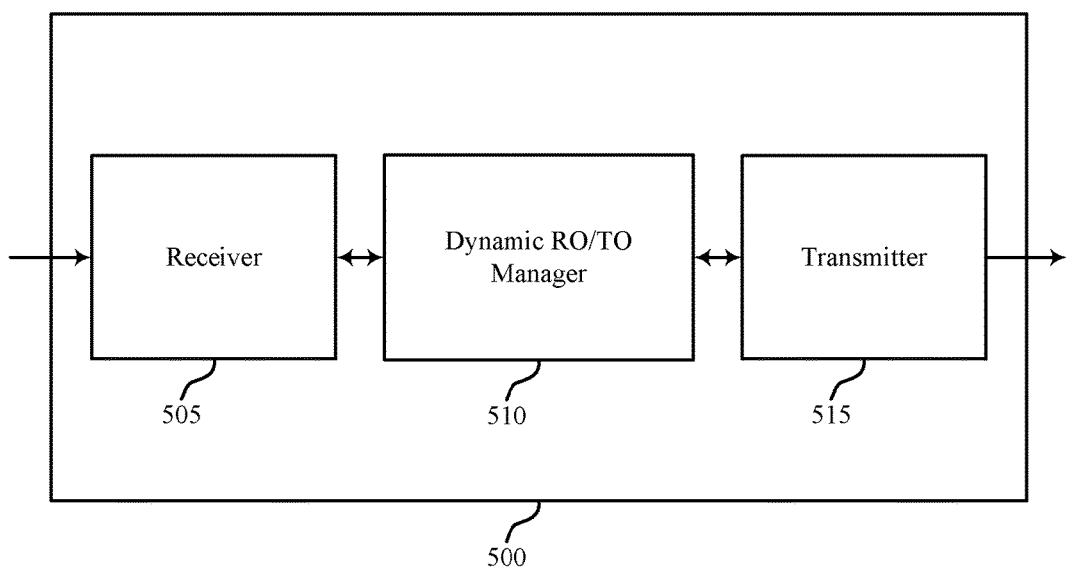
FIGS. 5 and 6 show block diagrams of wireless devices that support receiving upon transmit and transmitting upon receive, in accordance with one or more aspects of the present disclosure.

FIG. 5 shows a block diagram of a wireless device 500 that supports receiving upon transmit and transmitting upon receive, in accordance with one or more aspects of the present disclosure. Wireless device 500 may be an example of aspects of a UE 115 described with reference to FIGS. 1 through 4. Wireless device 500 may include receiver 505, dynamic RO/TO manager 510 and transmitter 515. Wireless device 500 may also include a processor. Each of these components may be in communication with each other.

The receiver 505 may receive information such as packets, user data, or control information associated with various information channels (e.g., control channels, data channels, and information related to receiving upon transmit and transmitting upon receive, etc.). Information may be passed on to other components of the device. The receiver 505 may be an example of aspects of the transceiver 825 described with reference to FIG. 8.

The dynamic RO/TO manager 510 may transmit (e.g., in cooperation with the transmitter 515) UL data associated with a service, identify that a reception opportunity is available for a response to the UL data based on a service type of the service, and receive (e.g., in cooperation with the receiver 505) a DL response to the UL data during the reception opportunity based on the identification.

The dynamic RO/TO manager 510 may also receive (e.g., in cooperation with the receiver 505) DL data associated with a service, identify that a transmission opportunity is available for a response to the DL data based on a service type of the service, and transmit (e.g., in cooperation with the transmitter 515) an UL response to the DL data during the transmission opportunity based on the identification. The dynamic RO/TO manager 510 may be an example of aspects of the dynamic RO/TO manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
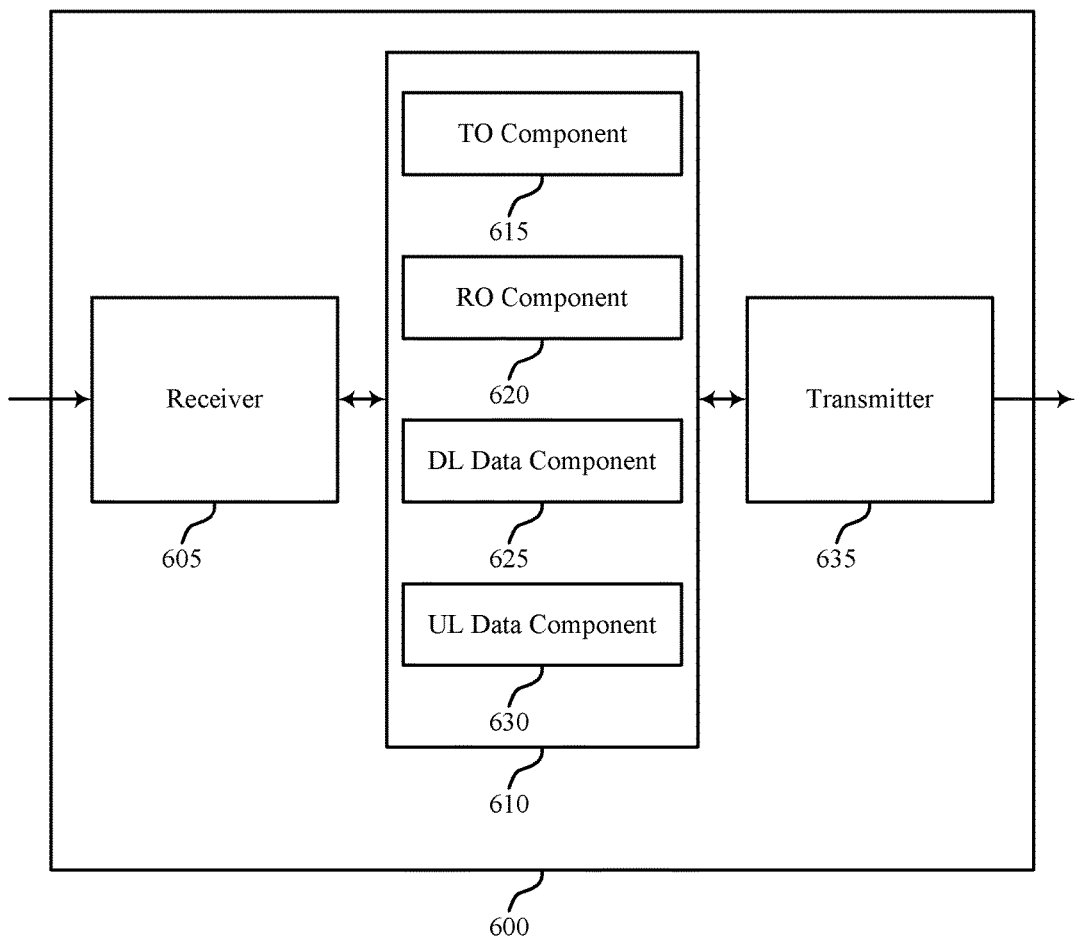

FIG. 6 shows a block diagram of a wireless device 600 that supports receiving upon transmit and transmitting upon receive, in accordance with one or more aspects of the present disclosure. Wireless device 600 may be an example of aspects of a wireless device 500 or a UE 115 described with reference to FIGS. 1 through 5. Wireless device 600 may include receiver 605, dynamic RO/TO manager 610 and transmitter 635. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The dynamic RO/TO manager 610 may be an example of aspects of dynamic RO/TO manager 510 described with reference to FIG. 5. The dynamic RO/TO manager 610 may include TO component 615, RO component 620, DL data component 625 and UL data component 630. The dynamic RO/TO manager 610 may be an example of aspects of the dynamic RO/TO manager 805 described with reference to FIG. 8.

The TO component 615 may identify that a transmission opportunity is available for a UL response to DL data based on a service type of the service. The RO component 620 may identify that a reception opportunity is available for a DL response to UL data based on a service type of the service. In some cases, the service type includes a service priority level, and a determination may be based on the service priority level. In some cases, the service type includes an upper protocol layer AM and the UL or DL response includes an ACK.

The DL data component 625 may receive DL data associated with a service, and may receive a DL response to UL data during an identified reception opportunity. The UL data component 630 may transmit UL data associated with a service, and may transmit an UL response to DL data during an identified transmission opportunity.

The transmitter 635 may transmit signals received from other components of wireless device 600. In some examples, the transmitter 635 may be collocated with a receiver in a transceiver module. For example, the transmitter 635 may be an example of aspects of the transceiver 825 described with reference to FIG. 8. The transmitter 635 may utilize a single antenna, or it may utilize a plurality of antennas.

Figure 7:
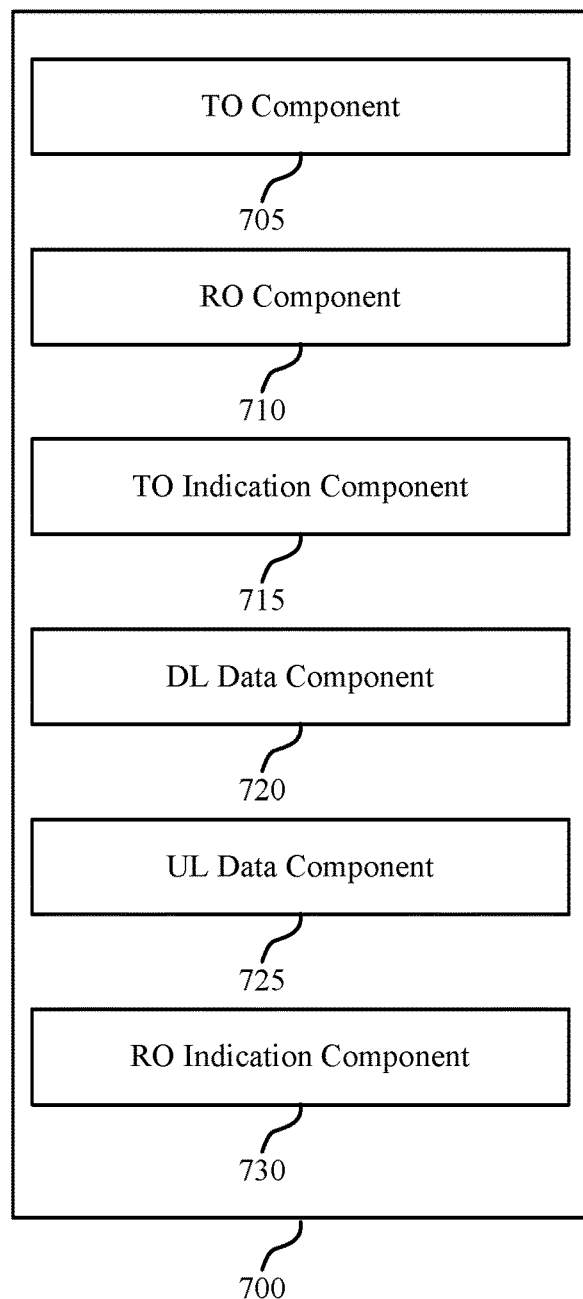
FIG. 7 shows a block diagram of a dynamic reception opportunity (RO)/transmission opportunity (TO) manager that supports receiving upon transmit and transmitting upon receive, in accordance with one or more aspects of the present disclosure.

FIG. 7 shows a block diagram of a dynamic RO/TO manager 700 that supports receiving upon transmit and transmitting upon receive, in accordance with one or more aspects of the present disclosure. Dynamic RO/TO manager 700 may be an example of aspects of dynamic RO/TO manager 510 or dynamic RO/TO manager 610 described with reference to FIGS. 5 and 6. The dynamic RO/TO manager 700 may also be an example of aspects of the dynamic RO/TO manager 805 described with reference to FIG. 8.

The dynamic RO/TO manager 700 may include TO component 705, RO component 710, TO indication component 715, DL data component 720, UL data component 725 and RO indication component 730. Each of these components may communicate, directly or indirectly, with one another (e.g., via one or more buses).

The TO component 705 may determine that a transmission opportunity is available for a response to the DL data based on a service type of the service. The RO component 710 may determine that a reception opportunity is available for a response to the UL data based on a service type of the service.

The TO indication component 715 may receive an indication that the transmission opportunity is available, and an identification of an available transmission opportunity may be based on the indication. The RO indication component 730 may receive an indication that the reception opportunity is available, and an identification of an available reception opportunity may be based on the indication.

The DL data component 720 may receive DL data associated with a service, and may receive a DL response to UL data during an identified reception opportunity. The UL data component 725 may transmit UL data associated with a service, and may transmit an UL response to DL data during an identified transmission opportunity.

Figure 8:
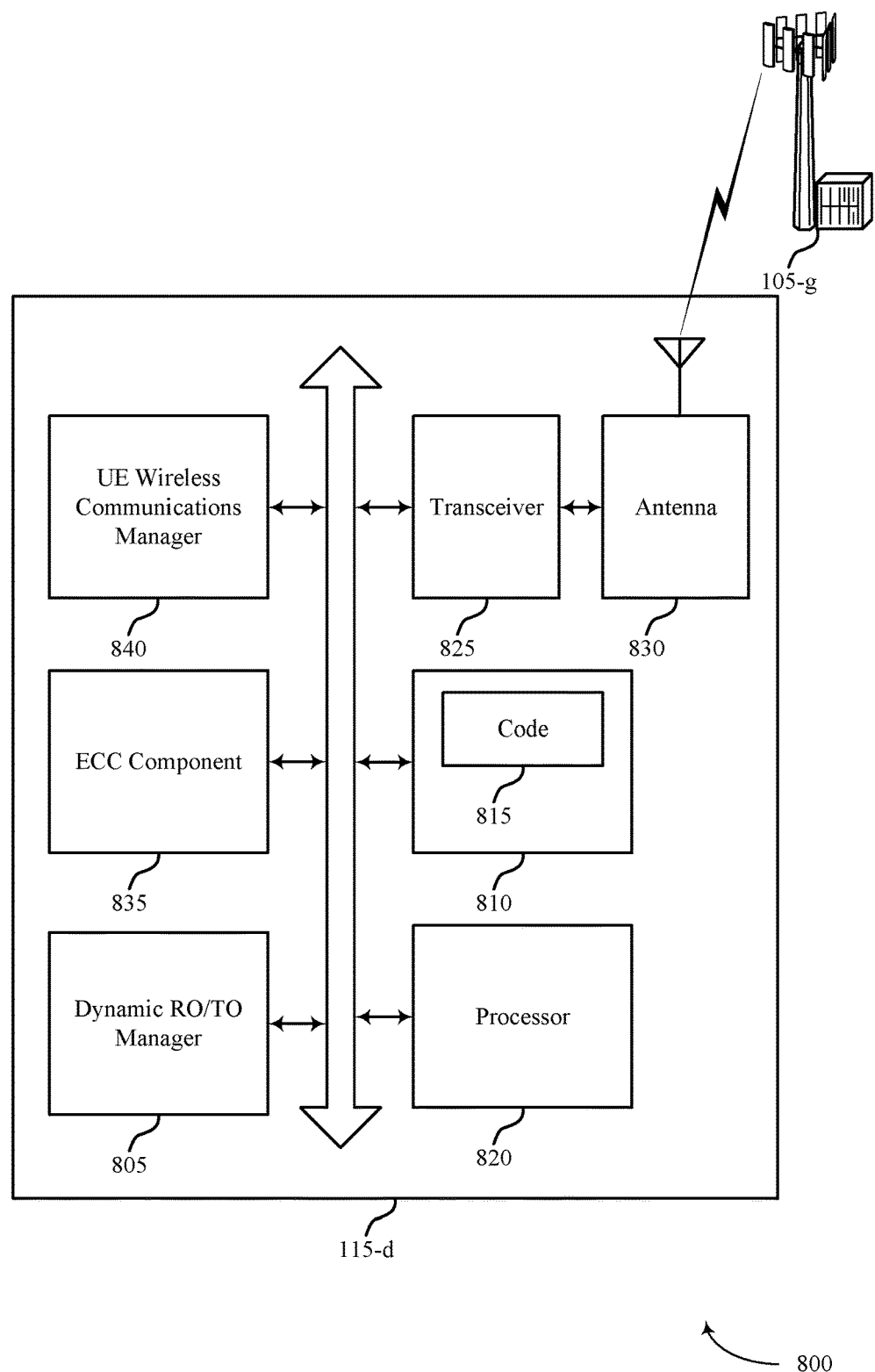
FIG. 8 shows a diagram of a system including a device that supports receiving upon transmit and transmitting upon receive, in accordance with one or more aspects of the present disclosure.

FIG. 8 shows a diagram of a system 800 including a device that supports receiving upon transmit and transmitting upon receive, in accordance with one or more aspects of the present disclosure. For example, system 800 may include UE 115-d, which may be an example of a wireless device 500, a wireless device 600, or a UE 115 as described with reference to FIGS. 1 through 7.

UE 115-d may include dynamic RO/TO manager 805, memory 810, processor 820, transceiver 825, antenna 830, ECC component 835, and UE wireless communications manager 840. Each of these components may communicate, directly or indirectly, with one another (e.g., via one or more buses). The dynamic RO/TO manager 805 may be an example of a dynamic RO/TO manager as described with reference to FIGS. 5 through 7.

The memory 810 may include random access memory (RAM) and read only memory (ROM). The memory 810 may store computer-readable, computer-executable code 815 including instructions that, when executed, cause the UE 115-d to perform various functions described herein (e.g., receiving upon transmit and transmitting upon receive, etc.). In some cases, the code 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a network device 105 (e.g., network device 105-g) or another UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

The ECC component 835 may enable operations using enhanced component carriers (ECCs) such as communication using shared or unlicensed spectrum, using reduced TTIs or subframe durations, or using a large number of component carriers. The UE wireless communications manager 840 may manage one or more aspects of wireless communication with other devices (e.g., network devices 105, other UEs 115, etc.). The UE wireless communications manager 840 may, for example, perform operations that support establishing an RRC connection with a network device 105.

Figure 9:
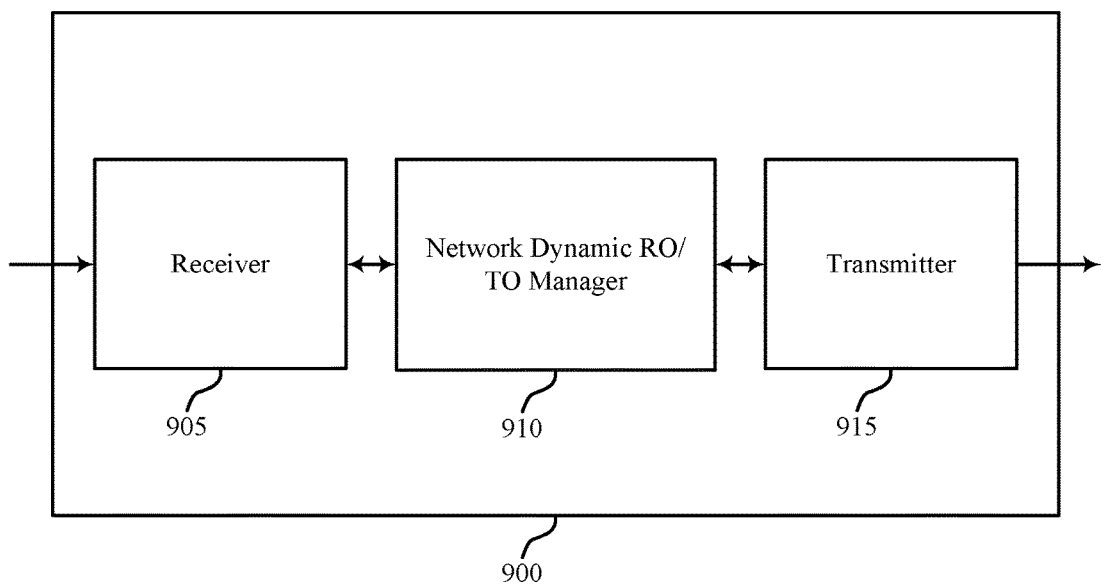
FIGS. 9 and 10 show block diagrams of wireless devices that support receiving upon transmit and transmitting upon receive, in accordance with one or more aspects of the present disclosure.

FIG. 9 shows a block diagram of a wireless device 900 that supports receiving upon transmit and transmitting upon receive, in accordance with one or more aspects of the present disclosure. Wireless device 900 may be an example of aspects of a network device 105 described with reference to FIGS. 1 through 4. Wireless device 900 may include receiver 905, network dynamic RO/TO manager 910 and transmitter 915. Wireless device 900 may also include a processor. Each of these components may be in communication with each other.

The receiver 905 may receive information such as packets, user data, or control information associated with various information channels (e.g., control channels, data channels, and information related to receiving upon transmit and transmitting upon receive, etc.). Information may be passed on to other components of the device. The receiver 905 may be an example of aspects of the transceiver 1225 described with reference to FIG. 12.

The network dynamic RO/TO manager 910 may transmit (e.g., in cooperation with the transmitter 915) DL data associated with a service, identify that a transmission opportunity is available for a response to the DL data based on a service type of the service, and receive (e.g., in cooperation with the receiver 905) an UL response to the DL data during the transmission opportunity based on the identification.

The network dynamic RO/TO manager 910 may also receive (e.g., in cooperation with the receiver 905) UL data associated with a service, identify that a reception opportunity is available for a response to the UL data based on a service type of the service, and transmit (e.g., in cooperation with the transmitter 915) a DL response to the UL data during the reception opportunity based on the identification. The network dynamic RO/TO manager 910 may also be an example of aspects of the network dynamic RO/TO manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
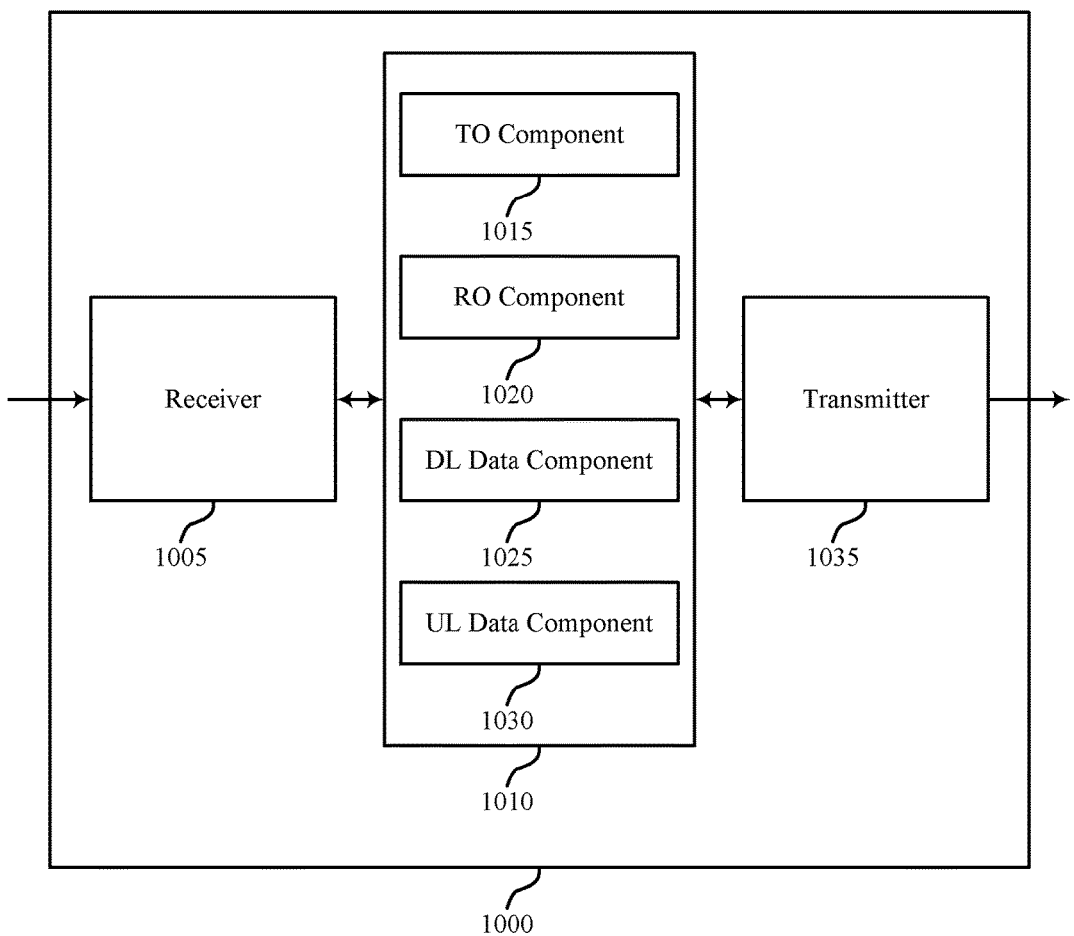

FIG. 10 shows a block diagram of a wireless device 1000 that supports receiving upon transmit and transmitting upon receive, in accordance with one or more aspects of the present disclosure. Wireless device 1000 may be an example of aspects of a wireless device 900 or a network device 105 described with reference to FIGS. 1 through 4 and 9. Wireless device 1000 may include receiver 1005, network dynamic RO/TO manager 1010 and transmitter 1035. Wireless device 1000 may also include a processor. Each of these components may be in communication with each other. The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The network dynamic RO/TO manager 1010 may be an example of aspects of network dynamic RO/TO manager 910 described with reference to FIG. 9. The network dynamic RO/TO manager 1010 may include TO component 1015, RO component 1020, DL data component 1025 and UL data component 1030. The network dynamic RO/TO manager 1010 may be an example of aspects of the network dynamic RO/TO manager 1205 described with reference to FIG. 12.

The TO component 1015 may identify that a transmission opportunity is available for a UL response to the DL data based on a service type of the service. The RO component 1020 may identify that a reception opportunity is available for a DL response to UL data based on a service type of the service. In some cases, the service type includes a service priority level, and the determination is based on the service priority level. In some cases, the service type includes an upper protocol layer AM and the UL or DL response includes an ACK The DL data component 1025 may transmit DL data associated with a service, and transmit a DL response to the UL data during an identified reception opportunity. The UL data component 1030 may receive UL data associated with a service, and may receive an UL response to DL data during an identified transmission opportunity.

The transmitter 1035 may transmit signals received from other components of wireless device 1000. In some examples, the transmitter 1035 may be collocated with a receiver in a transceiver module. For example, the transmitter 1035 may be an example of aspects of the transceiver 1225 described with reference to FIG. 12. The transmitter 1035 may utilize a single antenna, or it may utilize a plurality of antennas.

Figure 11:
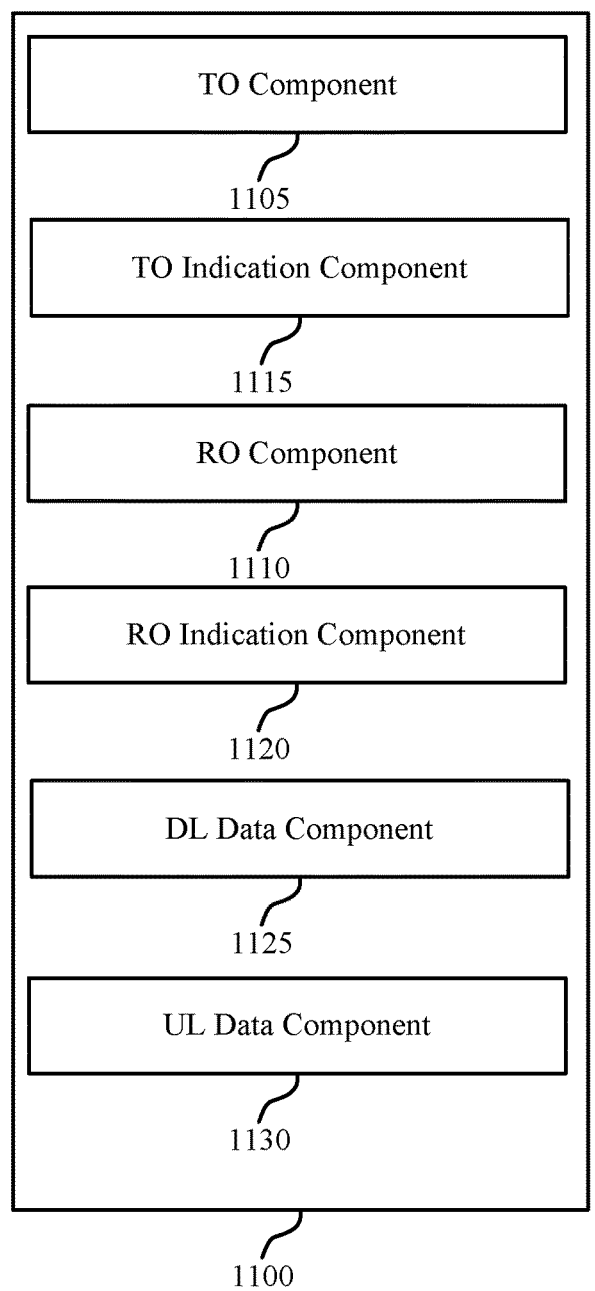
FIG. 11 shows a block diagram of a network dynamic RO/TO manager that supports receiving upon transmit and transmitting upon receive, in accordance with one or more aspects of the present disclosure.

FIG. 11 shows a block diagram of a network dynamic RO/TO manager 1100 that supports receiving upon transmit and transmitting upon receive, in accordance with one or more aspects of the present disclosure. Network dynamic RO/TO manager 1100 may be an example of aspects of network dynamic RO/TO manager 910 or network dynamic RO/TO manager 1010 described with reference to FIGS. 9 and 10. The network dynamic RO/TO manager 1100 may also be an example of aspects of the network dynamic RO/TO manager 1205 described with reference to FIG. 12.

The network dynamic RO/TO manager 1100 may include TO component 1105, RO component 1110, TO indication component 1115, RO indication component 1120, DL data component 1125 and UL data component 1130. Each of these components may communicate, directly or indirectly, with one another (e.g., via one or more buses).

The TO component 1105 may determine that a transmission opportunity is available for a response to DL data based on a service type of the service. The RO component 1110 may determine that a reception opportunity is available for a response to UL data based on a service type of the service.

The TO indication component 1115 may transmit an indication that the transmission opportunity is available, and identifying that the transmission opportunity is available may be based on the indication. The RO indication component 1120 may transmit an indication that the reception opportunity is available, and identifying that the reception opportunity is available may be based on the indication.

The DL data component 1125 may transmit DL data associated with a service, and transmit a DL response to UL data during an identified reception opportunity. The UL data component 1130 may receive UL data associated with a service, and may receive an UL response to the DL data during an identified transmission opportunity.

Figure 12:
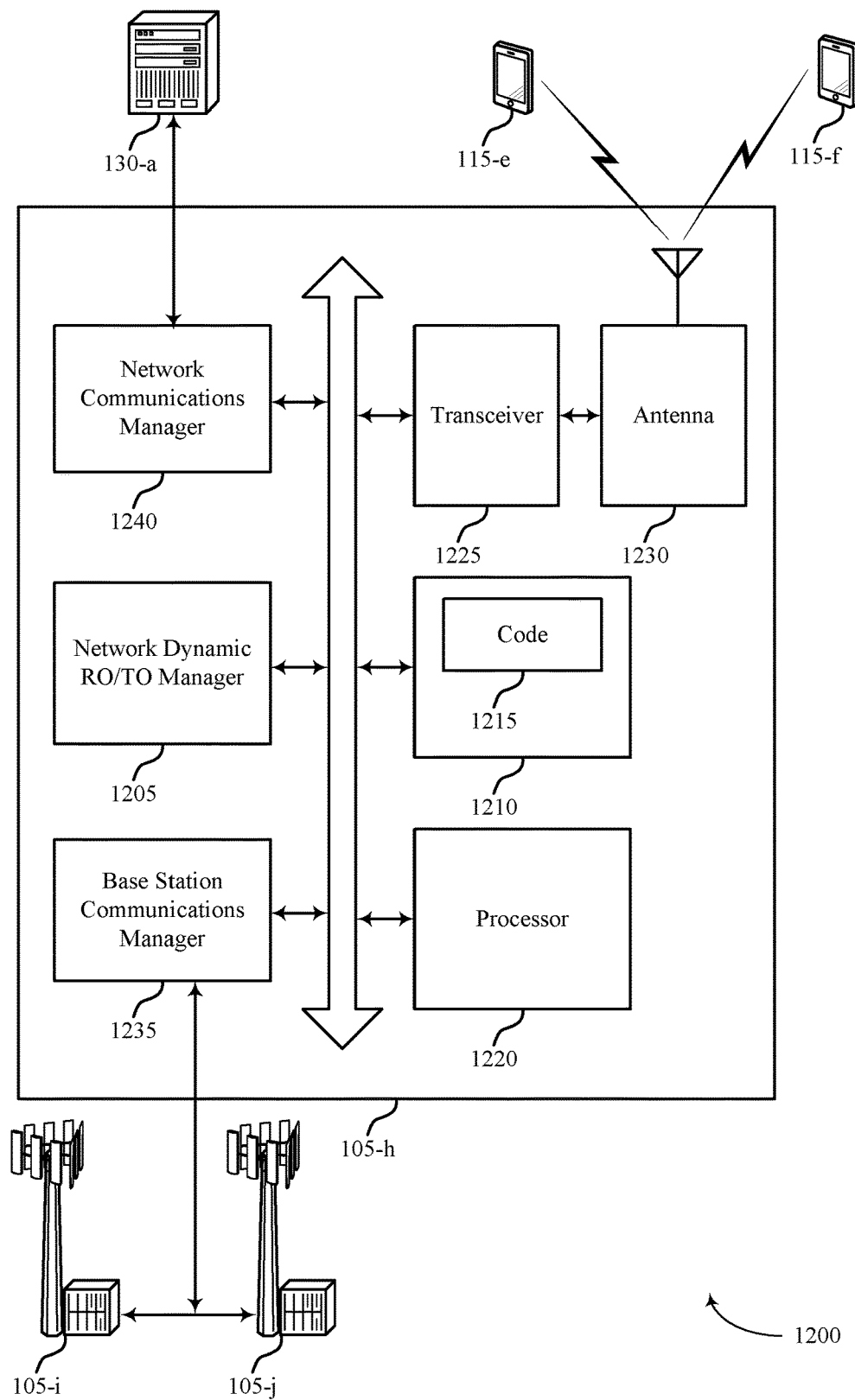
FIG. 12 shows a diagram of a system including a network device that supports receiving upon transmit and transmitting upon receive, in accordance with one or more aspects of the present disclosure.

FIG. 12 shows a diagram of a system 1200 including a network device that supports receiving upon transmit and transmitting upon receive, in accordance with one or more aspects of the present disclosure. For example, system 1200 may include network device 105-h, which may be an example of a wireless device 900, a wireless device 1000, or a network device 105 as described with reference to FIGS. 1, 2 and 9 through 11. Network device 105-h may also include components for bi-directional voice and data communications including components for transmitting communications and components for receiving communications. For example, network device 105-h may communicate bi-directionally with one or more UEs 115.

Network device 105-h may include network dynamic RO/TO manager 1205, memory 1210, processor 1220, transceiver 1225, antenna 1230, base station communications manager 1235 and network communications manager 1240. Each of these components may communicate, directly or indirectly, with one another (e.g., via one or more buses).

The network dynamic RO/TO manager 1205 may be an example of a network dynamic RO/TO manager as described with reference to FIGS. 9 through 11.

The memory 1210 may include RAM and ROM. The memory 1210 may store computer-readable, computer-executable code 1215 including instructions that, when executed, cause the processor to perform various functions described herein (e.g., receiving upon transmit and transmitting upon receive, etc.). In some cases, the code 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a network device 105 (e.g., network devices 105-i or 105-j) or a UE 115 (e.g., UEs 115-e or 115-f). The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1230, which may be capable of concurrently transmitting or receiving multiple wireless transmissions.

The base station communications manager 1235 may manage one or more aspects of communications with other network devices 105, and may include a controller or scheduler for controlling communications with UEs 115. For example, the base station communications manager 1235 may perform operations that support establishing an RRC connection with one or more UEs 115. In some examples one or more operations performed by the base station communications manager 1235 for controlling communications with UEs 115 may be performed in cooperation with other network devices 105. For example, the base station communications manager 1235 may coordinate scheduling for transmissions to UEs 115 for various interference mitigation techniques such as beamforming or joint transmission. In some examples, base station communications manager 1235 may provide an X2 interface within a Long Term Evolution (LTE) or LTE-Advanced wireless communication network technology to provide communication between network devices 105.

The network communications manager 1240 may manage communications with the core network (e.g., via one or more wired backhaul links 132). For example, the network communications manager 1240 may manage the transfer of data communications for client devices, such as one or more UEs 115.

Figure 13:
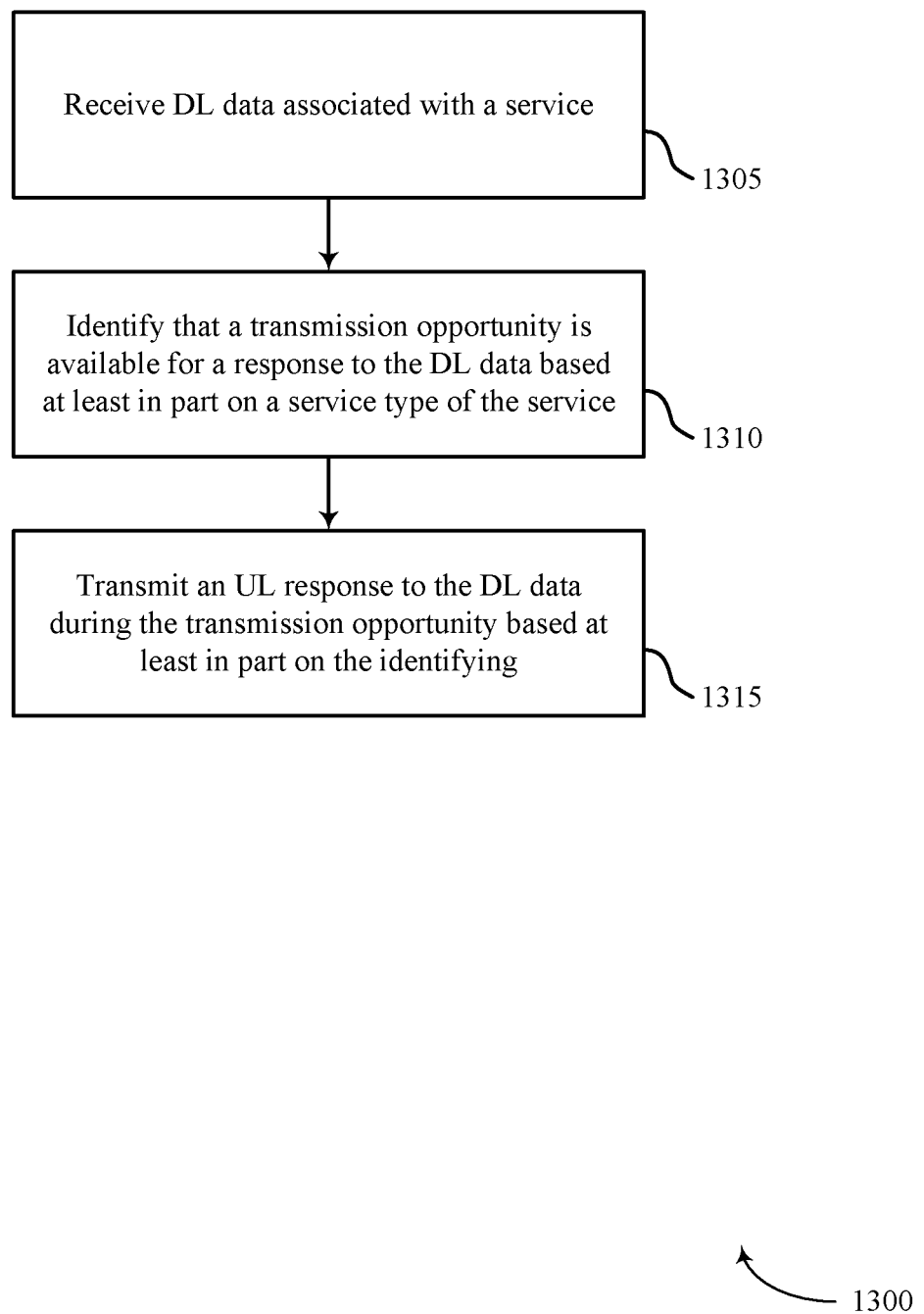
FIGS. 13 through 18 illustrate methods for receiving upon transmit and transmitting upon receive, in accordance with one or more aspects of the present disclosure.

FIG. 13 illustrates a method 1300 for transmitting upon receive, in accordance with one or more aspects of the present disclosure. The operations of method 1300 may be implemented by a device such as a UE 115 or its components as described with reference to FIGS. 1 through 6 and 8. For example, the operations of method 1300 may be performed by a dynamic RO/TO manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive DL data associated with a service, as described above with reference to FIGS. 2 through 4. The DL data may be received, for example, during an active duration of a DRX configuration (e.g., an on duration, an identified reception opportunity, etc.). In some examples, the operations of block 1305 may be performed by a DL data component 625 or 720 described with reference to FIGS. 6 and 7.

At block 1310, the UE 115 may identify that a transmission opportunity is available for a response to the DL data based on a service type of the service, as described above with reference to FIGS. 2 through 4. In some examples, the operations of block 1310 may be performed by a TO component 615 or 705 as described with reference to FIGS. 6 and 7.

At block 1315, the UE 115 may transmit an UL response to the DL data during the transmission opportunity based at least in part on the identifying, as described above with reference to FIGS. 2 through 4. In some examples, the operations of block 1315 may be performed by a UL data component 630 or 725 as described with reference to FIGS. 6 and 7.

Figure 14:
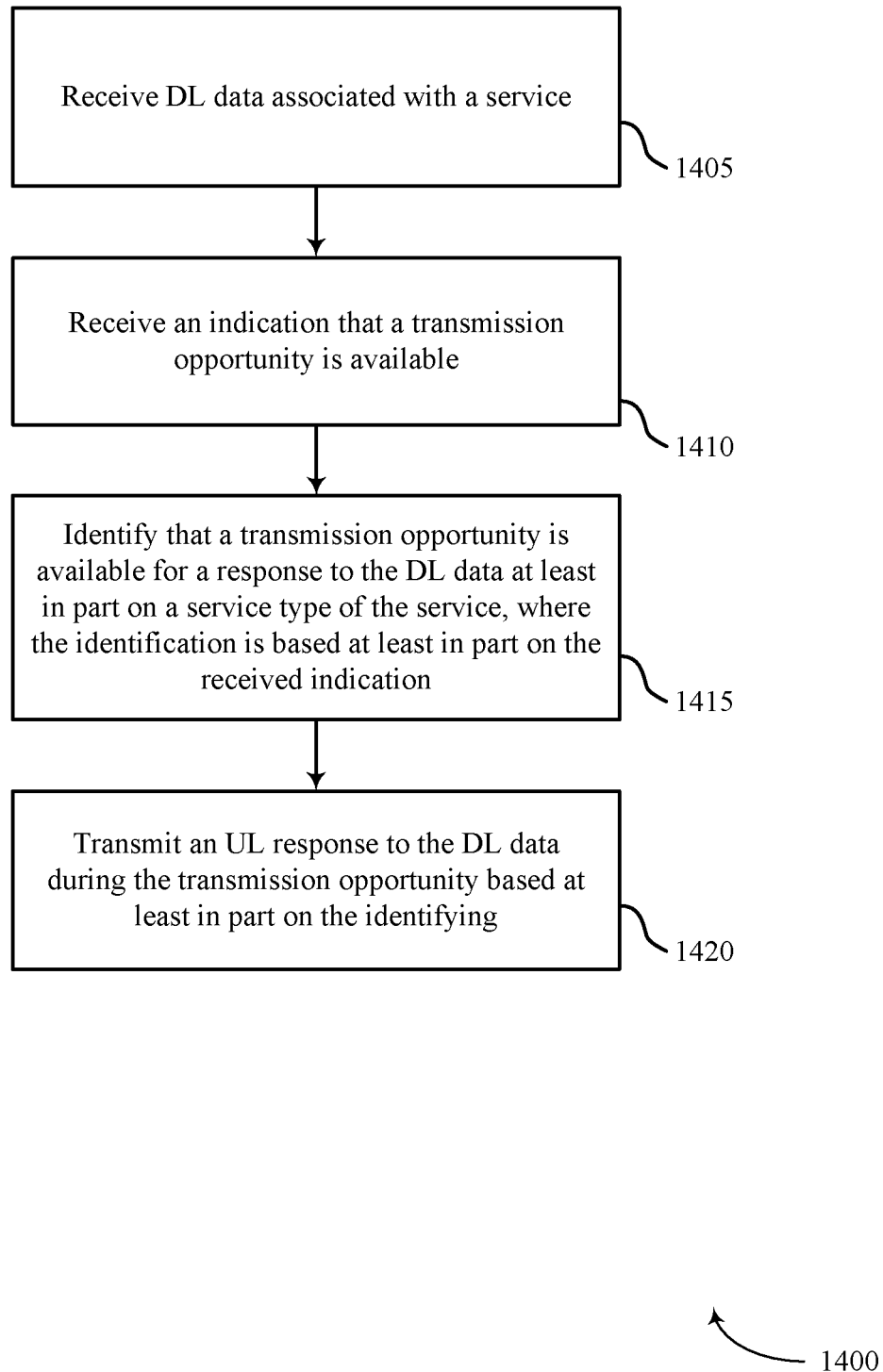

FIG. 14 illustrates a method 1400 for transmitting upon receive, in accordance with one or more aspects of the present disclosure. The operations of method 1400 may be implemented by a device such as a UE 115 or its components as described with reference to FIGS. 1 through 6 and 8. For example, the operations of method 1400 may be performed by a dynamic RO/TO manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive DL data associated with a service, as described above with reference to FIGS. 2 through 4. The DL data may be received during an active duration (e.g., an on duration, an identified reception opportunity, etc.) of a DRX configuration. In some examples, the operations of block 1405 may be performed by a DL data component 625 as described with reference to FIGS. 6 and 7.

At block 1410, the UE 115 may receive an indication that a transmission opportunity is available, as described above with reference to FIGS. 2 through 4. In some examples, the operations of block 1410 may be performed by a TO indication component 715 as described with reference to FIG. 7.

At block 1415, the UE 115 may identify that a transmission opportunity is available for a response to the DL data based at least in part on a service type of the service, where the determination is based at least in part on the received indication, as described above with reference to FIGS. 2 through 4. In some examples, the operations of block 1415 may be performed by a TO component 615 or 705 as described with reference to FIGS. 6 and 7.

At block 1420, the UE 115 may transmit an UL response to the DL data during the transmission opportunity based at least in part on the identifying, as described above with reference to FIGS. 2 through 4. In some examples, the operations of block 1420 may be performed by a UL data component 630 or 725 as described with reference to FIGS. 6 and 7.

Figure 15:
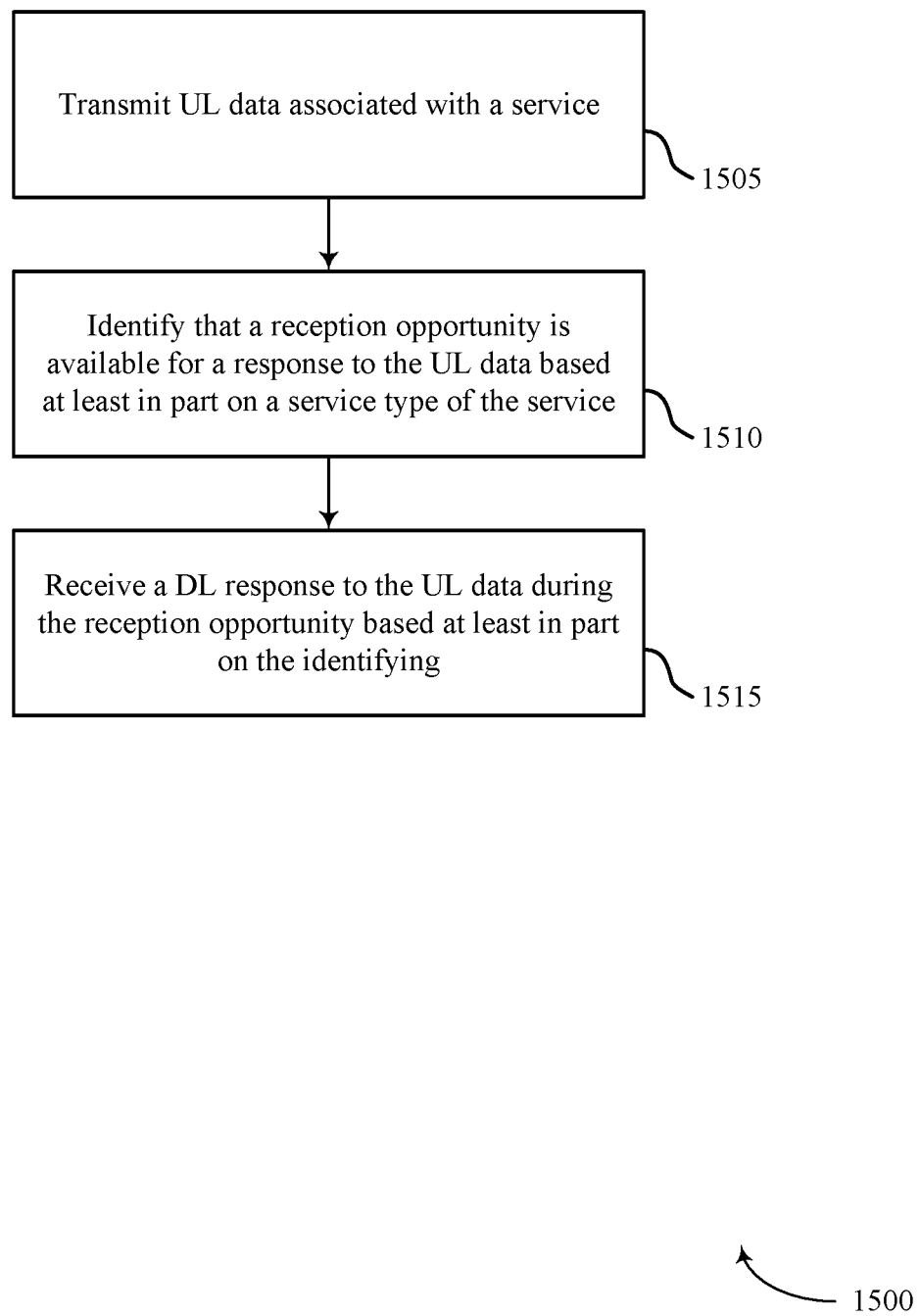

FIG. 15 illustrates a method 1500 for receiving upon transmit, in accordance with one or more aspects of the present disclosure. The operations of method 1500 may be implemented by a device such as a UE 115 or its components as described with reference to FIGS. 1 through 6 and 8. For example, the operations of method 1500 may be performed by a dynamic RO/TO manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may transmit UL data associated with a service as described, above with reference to FIGS. 2 through 4. In some examples, the operations of block 1505 may be performed by a UL data component 630 or 725 as described with reference to FIGS. 6 and 7.

At block 1510, the UE 115 may identify that a reception opportunity is available for a response to the UL data based at least in part on a service type of the service, as described above with reference to FIGS. 2 through 4. In some examples, the operations of block 1510 may be performed by a RO component 620 or 710 as described with reference to FIGS. 6 and 7.

At block 1515, the UE 115 may receive a DL response to the UL data during the reception opportunity based at least in part on the identifying, as described above with reference to FIGS. 2 through 4. In some examples, the operations of block 1515 may be performed by a DL data component 625 or 720 as described with reference to FIGS. 6 and 7.

Figure 16:
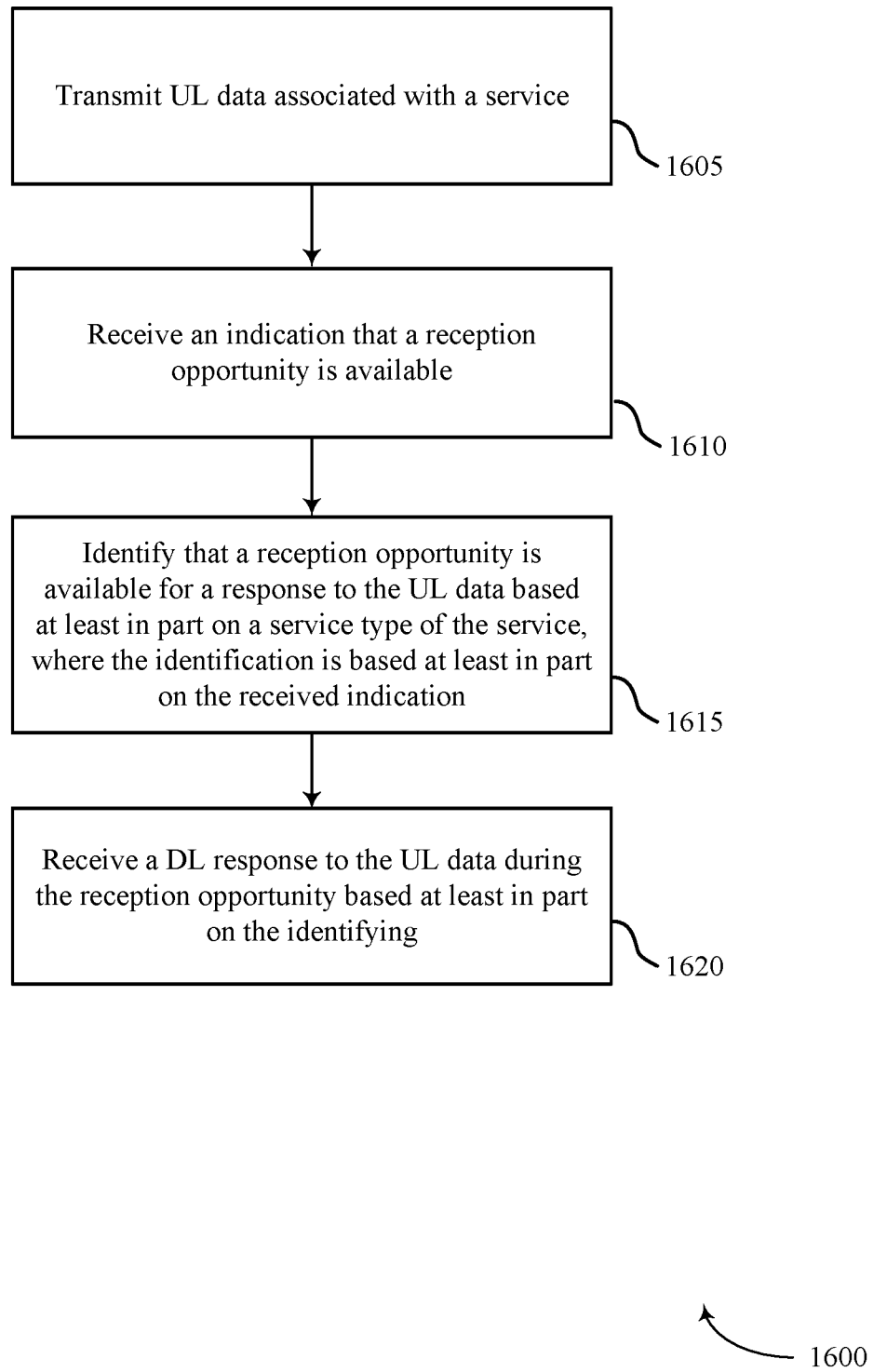

FIG. 16 illustrates a method 1600 for receiving upon transmit, in accordance with one or more aspects of the present disclosure. The operations of method 1600 may be implemented by a device such as a UE 115 or its components as described with reference to FIGS. 1 through 6 and 8. For example, the operations of method 1600 may be performed by a dynamic RO/TO manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may transmit UL data associated with a service, as described above with reference to FIGS. 2 through 4. In some examples, the operations of block 1605 may be performed by a UL data component 630 or 725 as described with reference to FIGS. 6 and 7.

At block 1610, the UE 115 may receive an indication that a reception opportunity is available, as described above with reference to FIGS. 2 through 4. In some examples, the operations of block 1610 may be performed by a RO indication component 730 as described with reference to FIGS. 6 and 7.

At block 1615, the UE 115 may identify that a reception opportunity is available for a response to the UL data based at least in part on a service type of the service, where the determination is based at least in part on the received indication, as described above with reference to FIGS. 2 through 4. In some examples, the operations of block 1615 may be performed by a RO component 620 or 710 as described with reference to FIGS. 6 and 7.

At block 1620, the UE 115 may receive a DL response to the UL data during the reception opportunity based at least in part on the identifying as described above with reference to FIGS. 2 through 4. In some examples, the operations of block 1620 may be performed by a DL data component 625 or 720 as described with reference to FIGS. 6 and 7.

Figure 17:
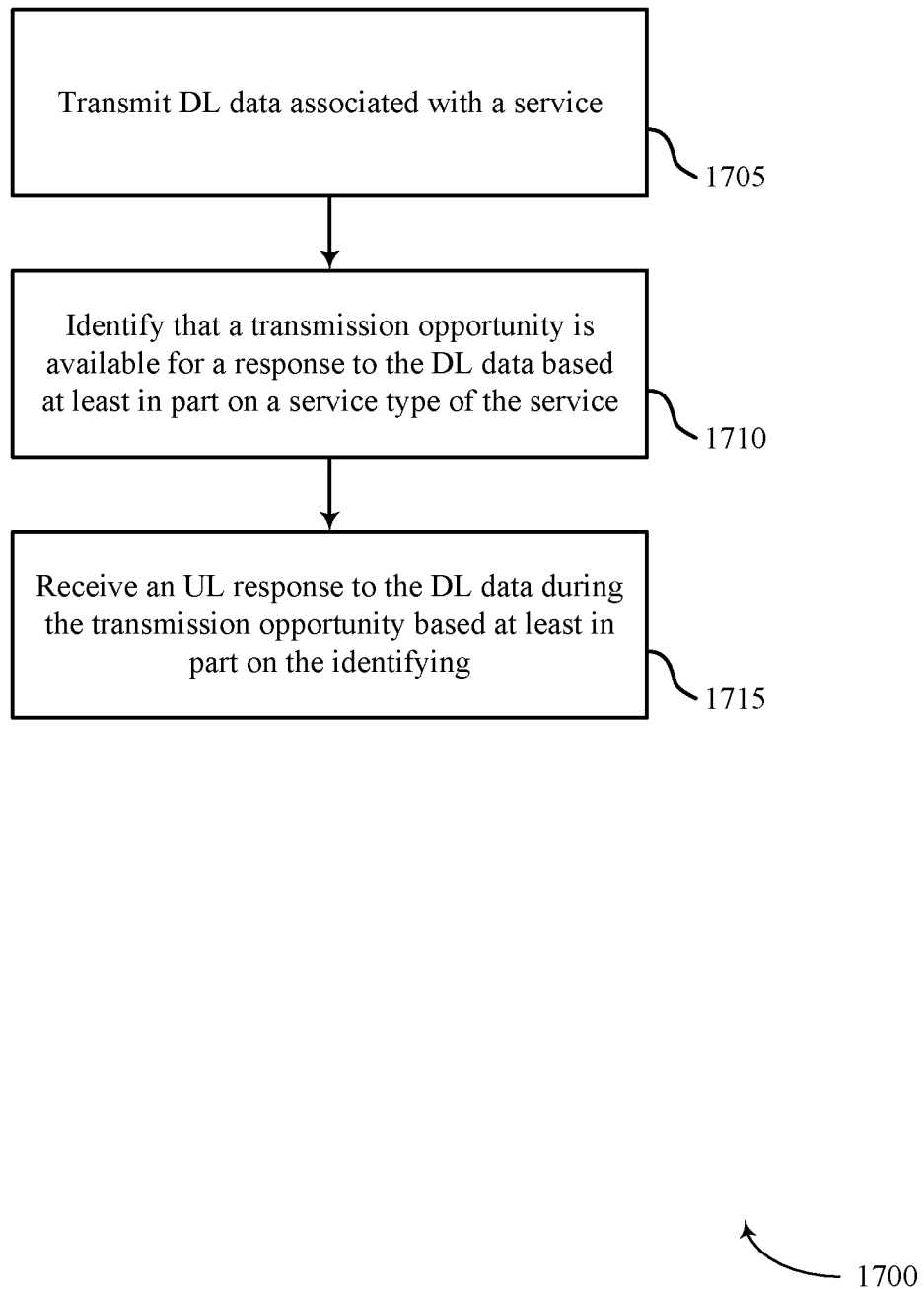

FIG. 17 illustrates a method 1700 for receiving upon transmit, in accordance with one or more aspects of the present disclosure. The operations of method 1700 may be implemented by a device such as a network device 105 or its components as described with reference to FIGS. 1 through 4, 9, 10, and 12. For example, the operations of method 1700 may be performed by a network dynamic RO/TO manager as described herein. In some examples, the network device 105 may execute a set of codes to control the functional elements of the device to perform the functions described below. Additionally or alternatively, the network device 105 may perform aspects the functions described below using special-purpose hardware.

At block 1705, the network device 105 may transmit DL data associated with a service, as described above with reference to FIGS. 2 through 4. In some examples, the operations of block 1705 may be performed by DL data component 1025 or 1125 as described with reference to FIGS. 10 and 11.

At block 1710, the network device 105 may identify that a transmission opportunity is available for a response to the DL data based at least in part on a service type of the service, as described above with reference to FIGS. 2 through 4. In some examples, the operations of block 1710 may be performed by a TO component 1015 or 1105 as described with reference to FIGS. 10 and 11.

At block 1715, the network device 105 may receive an UL response to the DL data during the transmission opportunity based at least in part on the identifying, as described above with reference to FIGS. 2 through 4. In some examples, the operations of block 1715 may be performed by a UL data component 1030 or 1130 as described with reference to FIGS. 10 and 11.

Figure 18:
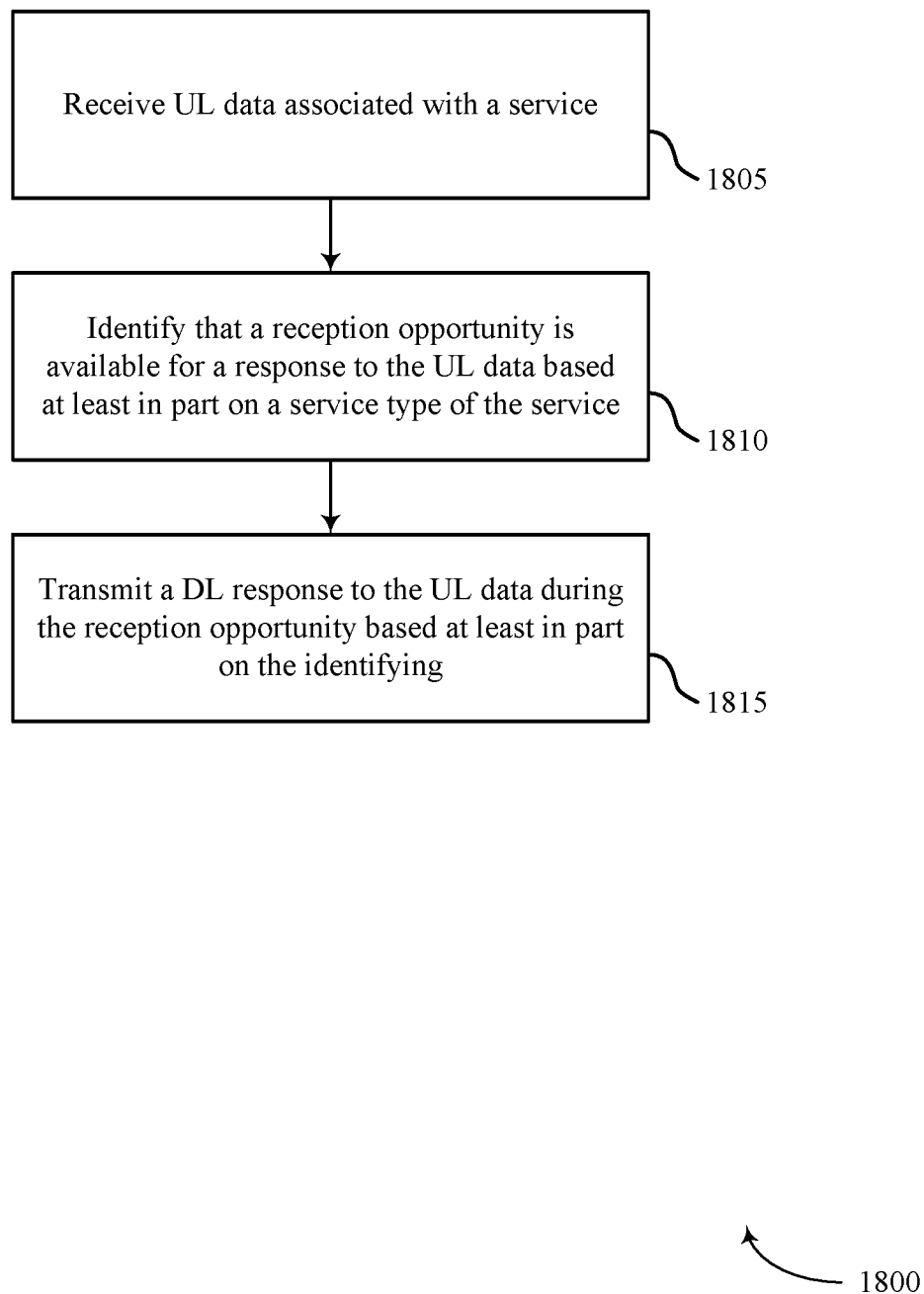

FIG. 18 illustrates a method 1800 for transmitting upon receive, in accordance with one or more aspects of the present disclosure. The operations of method 1800 may be implemented by a device such as a network device 105 or its components as described with reference to FIGS. 1 through 4, 9, 10, and 12. For example, the operations of method 1800 may be performed by a network dynamic RO/TO manager as described herein. In some examples, the network device 105 may execute a set of codes to control the functional elements of the device to perform the functions described below. Additionally or alternatively, the network device 105 may perform aspects the functions described below using special-purpose hardware.

At block 1805, the network device 105 may receive UL data associated with a service, as described above with reference to FIGS. 2 through 4. In some examples, the operations of block 1805 may be performed by a UL data component 1030 or 1130 as described with reference to FIGS. 10 and 11.

At block 1810, the network device 105 may determine that a reception opportunity is available for a response to the UL data based at least in part on a service type of the service, as described above with reference to FIGS. 2 through 4. In some examples, the operations of block 1810 may be performed by a RO component 1020 or 1110 as described with reference to FIGS. 10 and 11.

At block 1815, the network device 105 may transmit a DL response to the UL data during the reception opportunity based at least in part on the identifying as described above with reference to FIGS. 2 through 4. In some examples, the operations of block 1815 may be performed by a DL data component 1025 or 1125 as described with reference to FIGS. 10 and 11.

It should be noted that these methods describe possible implementation, and that operations may be rearranged or otherwise modified such that other implementations are possible. In some examples, aspects from two or more of the methods may be combined. For example, aspects of each of the methods may include operations or aspects of the other methods, or other operations or techniques described herein. Thus, aspects of the disclosure may provide for receiving upon transmit and transmitting upon receive.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), Institute of Electrical and Electronics Engineers (IEEE) 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending upon context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communication system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for receiving upon transmit and transmitting upon receive. It should be noted that these methods describe possible implementations, and that the operations may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

As used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

What is claimed is:

1. A method of wireless communication at a user equipment (UE) comprising:
    identifying a discontinuous reception (DRX) configuration comprising a plurality of reception occasions for downlink (DL) communications from a base station to the UE;
    receiving DL data associated with a service during a reception occasion of the plurality of reception occasions;
    identifying that a transmission opportunity for sending uplink (UL) data associated with the service in response to the DL data is available within an active duration of the reception occasion of the DRX configuration based at least in part on a service type of the service; and
    transmitting the UL data in response to the DL data during the transmission opportunity based at least in part on the identifying.

2. The method of claim 1, further comprising:
    modifying the reception occasion to comprise an UL response duration based at least in part on the service type, wherein the UL data is transmitted according to the modified reception occasion.

3. The method of claim 1, further comprising:
    modifying the active duration of the reception occasion of the DRX configuration to include the transmission opportunity based at least in part on identifying the service type of the service.

4. The method of claim 1, further comprising:
    receiving an indication that the transmission opportunity is available, wherein the identifying is based at least in part on the received indication.

5. The method of claim 1, wherein identifying that the transmission opportunity is available comprises a determination by the UE based at least in part on the service type of the service.

6. The method of claim 1, wherein the service type comprises an upper protocol layer acknowledgement (ACK) mode (AM) and the UL data in response to the DL data comprises an ACK.

7. The method of claim 1, wherein the service type comprises a service priority level, and wherein identifying that the transmission opportunity is available comprises a determination by the UE based at least in part on the service priority level.

8. A method of wireless communication at a user equipment (UE) comprising:
    identifying a discontinuous transmission (DTX) configuration comprising a plurality of transmission occasions for uplink (UL) communications from the UE to a base station;
    transmitting UL data associated with a service during a transmission occasion of the plurality of transmission occasions;
    identifying that a reception opportunity for receiving downlink (DL) data associated with the service in response to the UL data is available within an active duration of the transmission occasion of the DTX configuration based at least in part on a service type of the service; and
    receiving the DL data in response to the UL data during the reception opportunity based at least in part on the identifying.

9. The method of claim 8, further comprising:
    modifying the transmission occasion to comprise a DL response duration based at least in part on the service type, wherein the DL data is received according to the modified transmission occasion.

10. The method of claim 8, further comprising:
    modifying the active duration of the plurality of transmission occasions of the DTX configuration to include the reception opportunity based at least in part on identifying the service type of the service.

11. The method of claim 8, further comprising:
    receiving an indication that the reception opportunity is available, wherein the identifying is based at least in part on the indication.

12. The method of claim 8, wherein identifying that the reception opportunity is available comprises a determination by the UE based at least in part on the service type of the service.

13. The method of claim 8, wherein the service type comprises an upper protocol layer acknowledgement (ACK) mode (AM) and the DL data in response to the UL data comprises an ACK.

14. The method of claim 8, wherein the service type comprises a service priority level, and wherein identifying that the reception opportunity is available comprises a determination by the UE based at least in part on the service priority level.

15. A method of wireless communication at a wireless communications device comprising:
    identifying a discontinuous transmission (DTX) configuration comprising a plurality of transmission occasions for downlink (DL) communications from the wireless communications device to a UE;
    transmitting DL data associated with a service during a transmission occasion of the plurality of transmission occasions;
    identifying that a transmission opportunity for receiving uplink (UL) data associated with the service in response to the DL data is available within an active duration of the transmission occasion of the DTX configuration based at least in part on a service type of the service; and
    receiving the UL data in response to the DL data during the transmission opportunity based at least in part on the identifying.

16. The method of claim 15, further comprising:
    modifying the transmission occasion to comprise an UL response duration based at least in part on the service type, wherein the UL data is received according to the modified transmission occasion.

17. The method of claim 15, further comprising:
modifying the active duration of the plurality of transmission occasions of the DTX configuration to include the transmission opportunity based at least in part on identifying the service type of the service.

18. The method of claim 15, further comprising:
transmitting an indication that the identified transmission opportunity is available.

19. The method of claim 15, wherein identifying that the transmission opportunity is available comprises a determination by the wireless communications device based at least in part on the service type of the service.

20. The method of claim 15, wherein the service type comprises an upper protocol layer acknowledgement (ACK) mode (AM) and the UL data in response to the DL data comprises an ACK.

21. The method of claim 15, wherein the service type comprises a service priority level, and wherein identifying that the transmission opportunity is available comprises a determination by the wireless communications device based at least in part on the service priority level.

22. A method of wireless communication at a wireless communications device comprising:
identifying a discontinuous reception (DRX) configuration comprising a plurality of reception occasions for uplink (UL) communications from a UE to the wireless communications device;
receiving UL data associated with a service during a reception occasion of the plurality of reception occasions;
identifying that a reception opportunity for sending downlink (DL) data associated with the service in response to the UL data is available within an active duration of the reception occasion of the DRX configuration based at least in part on a service type of the service; and
transmitting DL data in response to the UL data during the reception opportunity based at least in part on the identifying.

23. The method of claim 22, further comprising:
modifying the reception occasion to comprise a DL response duration based at least in part on the service type, wherein the DL data is transmitted according to the modified reception occasion.

24. The method of claim 22, further comprising:
modifying the active duration of the reception occasion of the DRX configuration to include the reception opportunity based at least in part on identifying the service type of the service.

25. The method of claim 22, further comprising:
transmitting an indication that the identified reception opportunity is available.

26. The method of claim 22, wherein identifying that the reception opportunity is available comprises a determination by the wireless communications device based at least in part on the service type of the service.

27. The method of claim 22, wherein the service type comprises an upper protocol layer acknowledgement (ACK) mode (AM) and the DL data in response to the UL data comprises an ACK.

28. The method of claim 22, wherein the service type comprises a service priority level, and wherein identifying that the reception opportunity is available comprises a determination by the wireless communications device based at least in part on the service priority level.

* * * * *